(12) United States Patent
Hirota et al.

(10) Patent No.: US 6,606,707 B1
(45) Date of Patent: Aug. 12, 2003

(54) SEMICONDUCTOR MEMORY CARD

(75) Inventors: Teruto Hirota, Moriguchi (JP); Makoto Tatebayashi, Takarazuka (JP); Taihei Yugawa, Nara (JP); Masataka Minami, Burbank, CA (US); Masayuki Kozuka, Arcadia, CA (US)

(73) Assignee: Matsushita Electric Industrial Co., Ltd., Osaka-fu (JP)

(*) Notice: Subject to any disclaimer, the term of this patent is extended or adjusted under 35 U.S.C. 154(b) by 0 days.

(21) Appl. No.: 09/557,872

(22) Filed: Apr. 24, 2000

(51) Int. Cl.$^7$ ................................................. H04L 9/00
(52) U.S. Cl. ........................ 713/172; 713/192; 713/193
(58) Field of Search ................................ 713/172, 193, 713/194

(56) References Cited

U.S. PATENT DOCUMENTS

| | | | |
|---|---|---|---|
| 4,853,522 A | | 8/1989 | Ogasawara |
| 5,293,424 A | * | 3/1994 | Holtey et al. ............... 713/193 |
| 5,689,453 A | | 11/1997 | Tsukagoshi |
| 6,161,180 A | * | 12/2000 | Matyas et al. ............... 713/169 |
| 6,243,812 B1 | * | 6/2001 | Matyas et al. ............... 713/172 |

FOREIGN PATENT DOCUMENTS

| | | |
|---|---|---|
| DE | 195 36 206 | 4/1996 |
| EP | 0 792 044 | 8/1997 |
| EP | 0 856 818 | 8/1998 |
| JP | 05-314012 | 11/1993 |
| JP | 06-075861 | 3/1994 |
| JP | 08-115266 | 5/1996 |
| JP | 08-286976 | 11/1996 |

* cited by examiner

*Primary Examiner*—Gilberto Barrón
*Assistant Examiner*—Kambiz Zand
(74) *Attorney, Agent, or Firm*—Wenderoth, Lind & Ponack, L.L.P.

(57) ABSTRACT

A semiconductor memory card comprising a control IC 302, a flash memory 303, and a ROM 304. The ROM 304 holds information such as a medium ID 341 unique to the semiconductor memory card. The flash memory 303 includes an authentication memory 332 and a non-authentication memory 331. The authentication memory 332 can be accessed only by external devices which have been affirmatively authenticated. The non-authentication memory 331 can be accessed by external devices whether the external devices have been affirmatively authenticated or not. The control IC 302 includes control units 325 and 326, an authentication unit 321 and the like. The control units 325 and 326 control accesses to the authentication memory 332 and the non-authentication memory 331, respectively. The authentication unit 321 executes a mutual authentication with an external device.

4 Claims, 19 Drawing Sheets

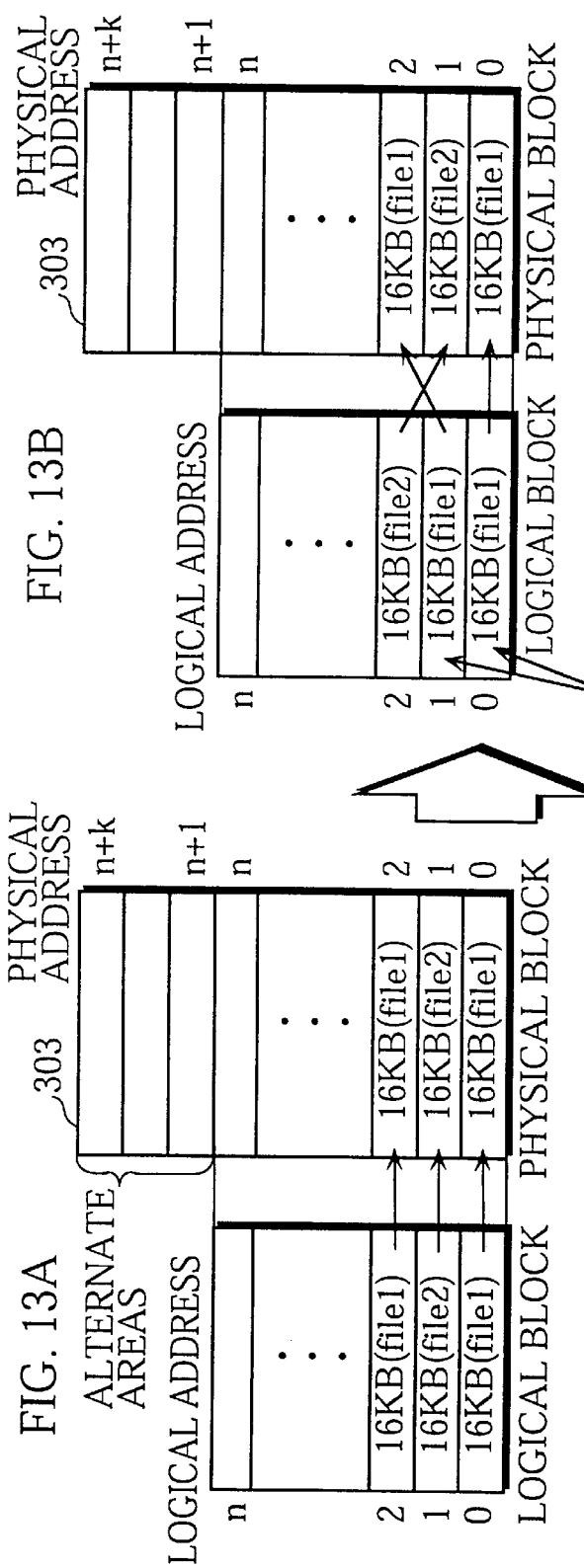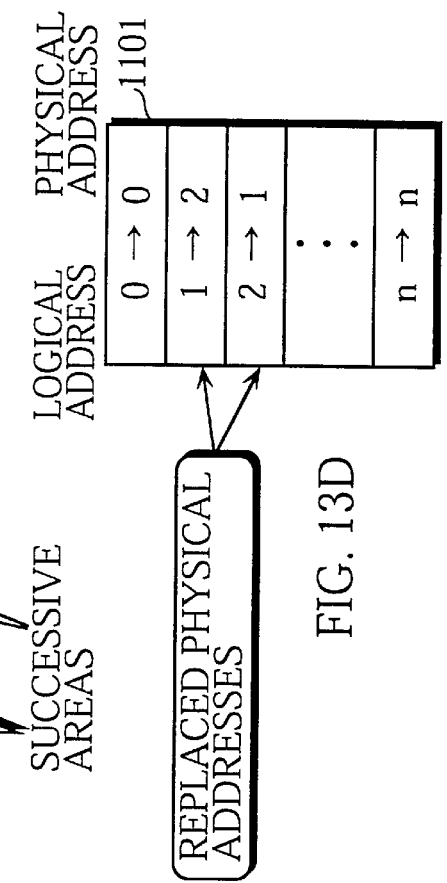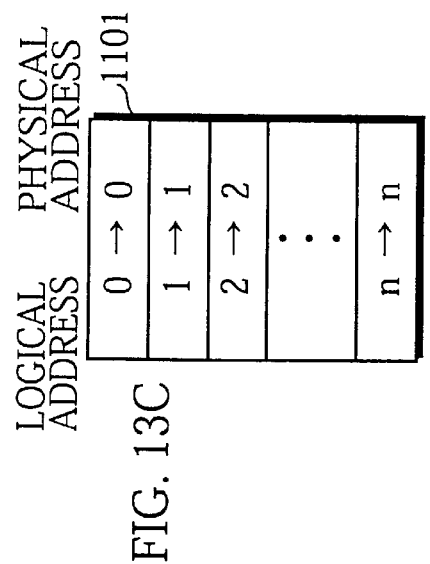

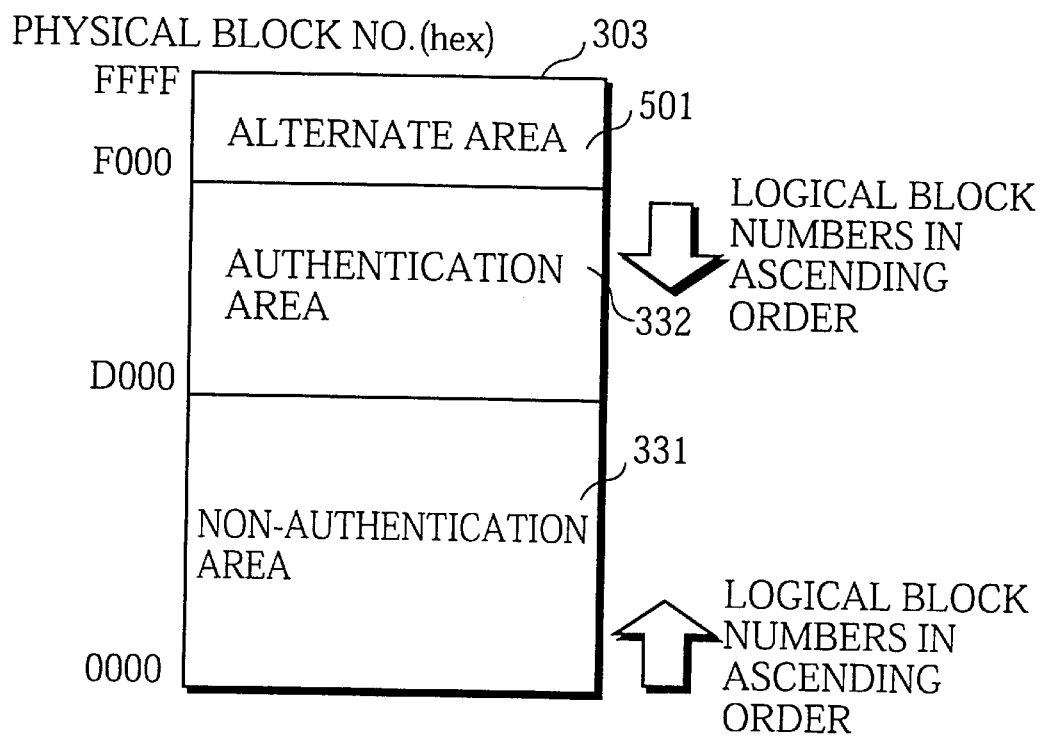

SEMICONDUCTOR MEMORY CARD

BACKGROUND OF THE INVENTION (1) Field of the Invention

The present invention relates to a semiconductor memory card for storing digital contents, and a data reading apparatus for reading out the digital contents from the semiconductor memory card. More particularly, the present invention relates to a semiconductor memory card and a data reading apparatus suitable for copyright protection of digital contents.

(2) Description of the Prior Art

The multimedia network technology has developed to the extent that digital contents such as music contents are distributed via a communication network such as the Internet. This makes it possible to access a variety of music or the like provided from around the world at home. For example, a music content can be downloaded into personal computer (hereafter referred to as PC), then stored in a semiconductor memory card loaded into the PC. Also, the semiconductor memory card can be removed from the PC and can be loaded into a portable music player. This enables one to listen to the music while walking. The semiconductor memory cards are compact and lightweight cards containing a nonvolatile semiconductor memory (e.g., a flash memory) and having a large storage capacity.

In such a music distribution, the digital contents to be stored in the semiconductor memory card need to be encrypted beforehand using a key or the like to prevent unauthorized copying of the digital contents. Also, an arrangement is required so that file management software programs, many of which are standard equipment on commercial PCs, cannot copy the digital contents to other storage mediums.

In one possible method for preventing unauthorized copying, only dedicated software programs are allowed to access the semiconductor memory card. For example, when an authentication process between a PC and a semiconductor memory card has completed affirmatively, a PC is allowed to access the semiconductor memory card; and when the authentication process has not completed affirmatively due to the lack of a dedicated software program, the PC is not allowed to access the semiconductor memory card.

However, in the above method in which PCs should always have a dedicated software program to access the semiconductor memory card, free data exchange with users via the semiconductor memory card is not available. As a result, the above method loses a merit of conventional semiconductor memory cards, namely, a merit that file management software programs being standard equipment on commercial PCs can be used to access the semiconductor memory card.

Semiconductor memory cards that can only be accessed through dedicated software programs are superior as storage mediums for storing digital contents since such semiconductor memory cards function to protect copyright of the digital contents. However, the semiconductor memory cards have a problem that they cannot be used as auxiliary storage apparatuses in general-purpose computer systems.

SUMMARY OF THE INVENTION

It is therefore an object of the present invention to provide a semiconductor memory card that can be used as a storage medium for storing digital contents and as a storage medium for storing general-purpose computer data (not an object of copyright protection), and to provide an apparatus for reading data from the storage medium.

The above object is fulfilled by a semiconductor memory card that can be used/removed in/from an electronic device, comprising: a rewritable nonvolatile memory; and a control circuit which controls accesses by the electronic device to an authentication area and a non-authentication area in the rewritable nonvolatile memory, wherein the control circuit includes: a non-authentication area access control unit which controls accesses by the electronic device to the non-authentication area; an authentication unit which performs an authentication process to check whether the electronic device is proper, and affirmatively authenticates the electronic device when the electronic device is proper; and an authentication area access control unit which permits the electronic device to access the authentication area only when the authentication unit affirmatively authenticates the electronic device.

With the above construction, the data being an object of copyright protection can be stored in the authentication area and other data can be stored in the non-authentication area, which makes it possible to achieve a semiconductor memory card which is capable of storing both digital contents to be copyright-protected and other data together.

In the above semiconductor memory card, the authentication unit may generate a key reflecting a result of the authentication process, and the authentication area access control unit decrypts an encrypted instruction using the key generated by the authentication unit, and controls accesses by the electronic device to the authentication area in accordance with the decrypted instruction, the encrypted instruction being sent from the electronic device.

With the above construction, even if the communication between the semiconductor memory card and in electronic device is tapped, the instruction to access the authentication area has been encrypted, reflecting the result of the preceding authentication. Accordingly, such a semiconductor memory card has a reliable function to protect an unauthorized access of the authentication area.

In the above semiconductor memory card, the authentication unit may perform a challenge-response type mutual authentication with the electronic device, and generates the key from challenge data and response data, the challenge data being sent to the electronic device to check whether the electronic device is proper, and the response data being generated to show the authentication unit is proper.

With the above construction, the key is shared by the semiconductor memory card and the electronic device only when both devices affirmatively authenticate each other. Furthermore, the key changes for each authentication. This enhances the security of the authentication area since the authentication area cannot be accessed without using the key.

In the above semiconductor memory card, the encrypted instruction sent from the electronic device may include a tag field and an address field, the tag field not having been encrypted and specifying a type of an access to the authentication area, the address field having been encrypted and specifying an address of an area to be accessed, wherein the authentication area access control unit decrypts the address field using the key, and controls accesses by the electronic device to the authentication area so that an access of the type specified in the tag field is made to the area indicated by the address in the decrypted address field.

With the above construction, only the address field of the instruction is encrypted. This facilitates the decryption and the decoding of the instruction by the semiconductor memory card which receives the instruction.

The above semiconductor memory card may further comprise: an identification data storage circuit which prestores identification data which is unique to the semiconductor memory card and enables the semiconductor memory card to be discriminated from other semiconductor memory cards, wherein the authentication unit performs a mutual authentication with the electronic device using the identification data stored in the identification data storage circuit, and generates the key from the identification data.

With the above construction, in the mutual authentication process, data unique to each semiconductor memory card is exchanged. This keeps a superior security level against unauthorized decoding of the mutual authentication.

The above semiconductor memory card may further comprise: an area resizing circuit which resizes the authentication area and the non-authentication area.

With the above construction, the semiconductor memory card can be used dynamically. That is, the semiconductor memory card can be used mainly as a recording medium for digital contents and can be used as an auxiliary storage apparatus in a commuter system.

In the above semiconductor memory card, the authentication area and the non-authentication area may be produced by dividing a continuous area of a predetermined size in the rewritable nonvolatile memory into two, and the area resizing circuit resizes the authentication area and the non-authentication area by changing an address marking a boundary between the authentication area and the non-authentication area.

With the above construction, the size of the authentication and non-authentication areas can be changed only by moving the boundary. This reduces the circuit size.

In the above semiconductor memory card, the area resizing circuit may include: an authentication area conversion table which shows correspondence between logical addresses and physical addresses in the authentication area; a non-authentication area conversion table which shows correspondence between logical addresses and physical addresses in the non-authentication area; and a conversion table change unit which changes contents of the authentication area conversion table and the non-authentication area conversion table in accordance with an instruction from the electronic device, wherein the authentication area access control unit controls accesses by the electronic device to the authentication area by referring to the authentication area conversion table, and the non-authentication area access control unit controls accesses by the electronic device to the non-authentication area by referring to the non-authentication area conversion table.

With the above construction, it is possible to separately manage the authentication area and the non-authentication area in terms of the area size and relationships between the logical addresses and physical addresses since conversion tables for these areas are independently operated.

In the above semiconductor memory card, an area addressed with higher physical addresses and an area addressed with lower physical addresses both constituting the area having the predetermined size may be respectively allocated to the authentication area and the non-authentication area, the non-authentication area conversion table shows correspondence between logical addresses arranged in ascending order and physical addresses arranged in ascending order, and the authentication area conversion table shows correspondence between logical addresses arranged in ascending order and physical addresses arranged in descending order.

With the above construction which enables the logical addresses to be used in ascending order, the area size can be changed easily since the probability of use of an area around the boundary between the authentication area and the non-authentication area becomes low. This also lowers the probability of occurrence of data saving or moving which is required to move the boundary, resulting in a simplified area size change.

The above semiconductor memory card may further comprise: a read-only memory circuit which prestores data.

With the above construction, the function of copyright protection is enhanced by storing identification data of the semiconductor memory card in the dedicated memory and storing the digital contents depending on the results of identification based on the identification data.

In the above semiconductor memory card, each of the authentication area and the non-authentication area may include: a read/write storage area from/to which the electronic device can read/write data; and a read-only storage area from which the electronic device can read data but to which the electronic device cannot write data, the control circuit further includes: a random number generator which generates a random number each time the electronic device writes data to the rewritable nonvolatile memory, and each of the authentication area access control unit and the non-authentication area access control unit encrypts data using the random number, writes the encrypted data to the read/write storage area, and writes the random number to the read-only storage area.

With the above construction, unauthorized attempts such as tampering of the read/write storage area can be detected by checking the compatibility with the random number stored in the read-only storage area. This enhances the safety of data writing.

In the above semiconductor memory card, the control circuit further may include: a conversion table which shows correspondence between logical addresses and physical addresses in each of the authentication area and the non-authentication area; and a conversion table change circuit which changes contents of the conversion table in accordance with an instruction from the electronic device, and the authentication area access control unit and the non-authentication area access control unit control accesses by the electronic device to the authentication area and the non-authentication area, respectively, by referring to the conversion table.

With the above construction, even if the plurality of logical blocks constituting the same file are fragmented, they can be easily changed to become logically successive. This increases the speed of accessing the same file.

In the above semiconductor memory card, the control circuit may further include: an encryption/decryption unit which encrypts data to be written to the authentication area and the non-authentication area and decrypts data read out from the authentication area and the non-authentication area.

With the above construction, it is possible to defend the authentication area and the non-authentication area against unauthorized attacks such as destroying the semiconductor memory card and directly reading the contents of these areas.

In the above semiconductor memory card, the nonvolatile memory may be a flash memory, and the control circuit further includes: a not-deleted list read unit which, in accordance with an instruction from the electronic device, identifies not-deleted areas in the authentication area and the non-authentication area, and sends information indicating the not-deleted areas to the electronic device.

With the above construction, the electronic device can identify not-deleted areas and delete the identified not-deleted areas before the flash memory is rewritten. This increases the speed of the rewriting.

In the above semiconductor memory card, the authentication unit may request a user of the electronic device to input a user key, which is information unique to the user, during the authentication process, and the control circuit further includes: a user key storage unit which stores the user key; an identification information storage unit which stores a piece of identification information identifying an electronic device that has been affirmatively authenticated by the authentication unit; and a user key request prohibition unit which obtains a piece of identification information from a target electronic device after the authentication unit starts the authentication process, checks whether the piece of identification information obtained from the target electronic device has already been stored in the identification information storage unit, and prohibits the authentication unit from requesting a user of the electronic device to input a user key when the piece of identification information obtained from the target electronic device has already been stored in the identification information storage unit.

With the above construction, the user need not input a password or personal data each time the user accesses the semiconductor memory card. This prevents the occurrence of unauthorized tapping and using of the personal data.

The above object is also fulfilled by a data reading apparatus for reading out a digital content from the above semiconductor memory card, the digital content having been stored in the non-authentication area of the semiconductor memory card, and information indicating the number -of times the digital content can be read out being prestored in the authentication area, the data reading apparatus comprising: a judgement means for, when the digital content is to be read out from the non-authentication area, reading out the information indicating the number of times the digital content can be read out from the authentication area, and judging whether the digital content can be read out based on the number of times indicated in the information; and a reproduction means for reading out the digital content from the non-authentication area only when the judgement means judges that the digital content can be read out, and reducing the number of times the digital content can be read out in the information stored in the authentication area.

With the above construction, it is possible to limit the number of times the digital content is read out from the semiconductor memory card. This enables the present invention to be applied to chargeable, rental music contents.

The above object is also fulfilled by a data reading apparatus for reading out a digital content from the above semiconductor memory card and reproducing the read-out digital content as an analog signal, the digital content, which can be reproduced as an analog signal, having been stored in the non-authentication area of the semiconductor memory card, and information indicating the number of times the digital content can be digitally output by the electronic device having been stored in the authentication area, the data reading apparatus comprising: a reproduction device operable to read out the digital content from the non-authentication area and reproduce the read-out digital content as an analog signal; a judgement device operable to read out the information indicating the number of times the digital content can be digitally output by the electronic device, and judge whether the digital content can be digitally output based on the number of times indicated in the information; and a digital output device operable to digitally output the digital content only when the judgement device judges that the digital content can be digitally output, and reduce the number of times the 3 digital content can be digitally output in the information stored in the authentication area.

With the above construction, it is possible to limit the number of times the digital content is digitally copied from the semiconductor memory card. This provides a copyright protection detailed with caution and attentiveness as intended by the copyright owner.

As described above, the present invention is a semiconductor memory card functioning with flexibility both as a recording medium for storing digital contents and an auxiliary storage apparatus of a computer. The present invention especially secures healthy distribution of digital contents for electronic music distribution. This is practically valuable.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 7A shows rules to be followed for accessing each area, FIG. 7B shows rules to be followed for changing the size of each area, and FIG. 7C is a schematic representation of areas in the semiconductor memory card;

FIGS. 13A to 13D show a change in the relationship between the logical addresses and physical addresses, where FIG. 13A shows the relationship before the change, FIG. 13B shows the relationship after the change, FIG. 13C shows a conversion table corresponding to FIG. A, and FIG. 13D shows a conversion table corresponding to FIG. B;

FIG. 14A shows the use state of logical and physical blocks and physical blocks, FIG. 14B shows the not-deleted block list corresponding to the use state of the blocks shown in FIG. 14A, FIG. 14C is a flowchart showing the procedure of the PC or the player for deleting blocks beforehand using the not-deleted block list command and the delete command, and FIG. 14D is a table showing the use state of the logical blocks;

FIG. 18A is a memory map showing the construction of the physical blocks in the flash memory, FIG. 18B shows a conversion table dedicated to the non-authentication area, and FIG. 18C shows a conversion table dedicated to the authentication area; and FIGS. 19A to 19C show the state after the boundary between the authentication and non-authentication areas of the semiconductor memory card is changed, where FIG. 19A is a memory map showing the construction of the physical blocks in the flash memory, FIG. 19B shows a conversion table dedicated to the non-authentication area, and FIG. 19C shows a conversion table dedicated to the authentication area.

DESCRIPTION OF THE PREFERRED EMBODIMENTS

An embodiment of the present invention will be described with reference to the drawings.

Figure 1:
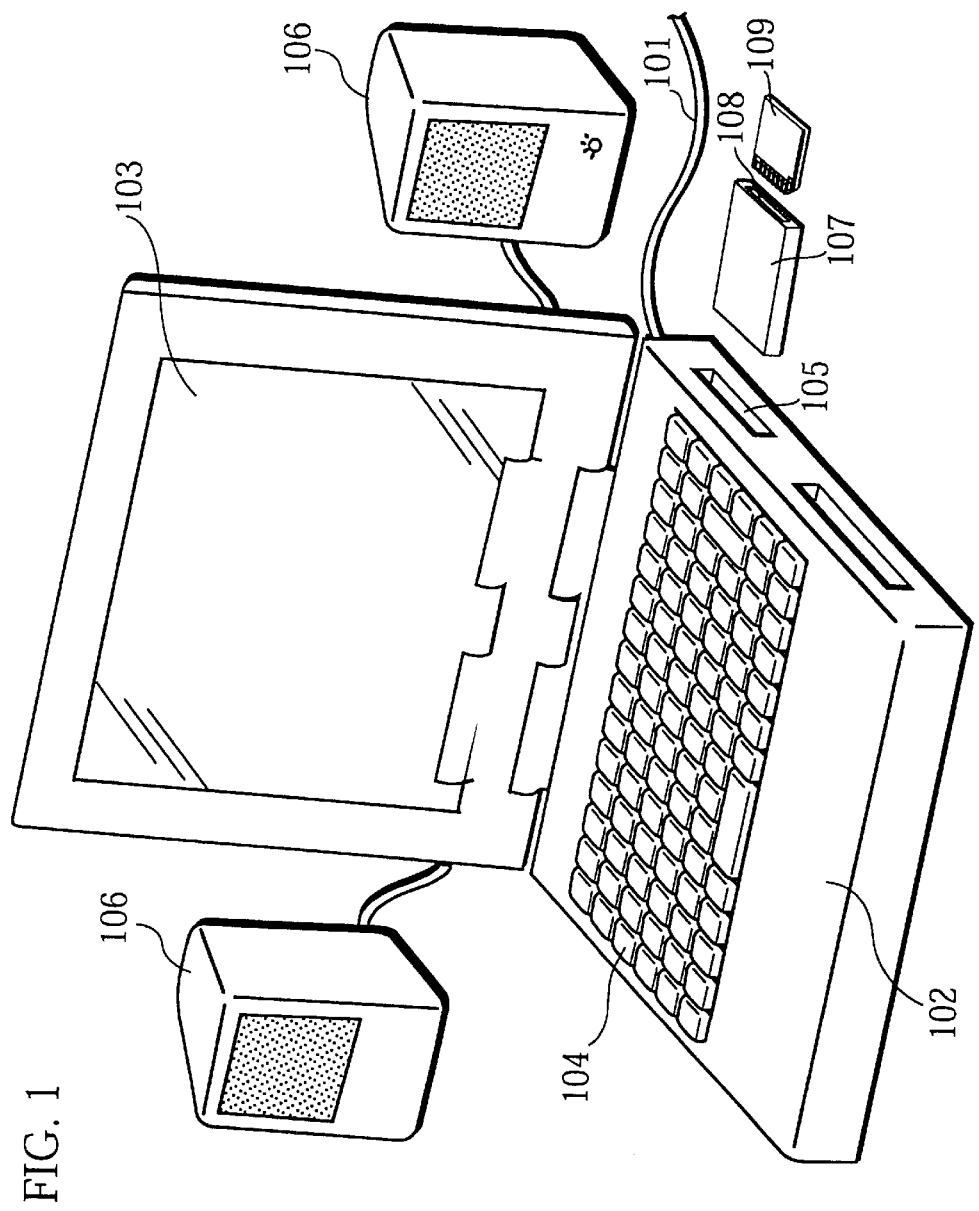
FIG. 1 shows the appearance of a PC which is an embodiment of the present invention and is related to an electronic music distribution, and shows the appearance of a semiconductor memory card which can be loaded into and removed from the PC.

FIG. 1 is a schematic representation of a PC which downloads digital contents such as music contents via a communication network, and a semiconductor memory card (hereafter referred to as memory card) which can be loaded into and removed from the PC.

A PC 102 includes a display 103, a keyboard 104, and speakers 106, and is connected to a communication line 101 via a modem embedded in the PC 102. A memory card writer 107 has been inserted into a card slot (a memory card writer insertion slot 105) of the PC 102. The memory card writer insertion slot 105 is based on PCMCIA (Personal Computer Memory Card International Association) standards or the like. The memory card writer 10i is an adaptor which electrically connects the PC 102 and a memory card 109. The memory card 109 is inserted into a memory card insertion slot 108 of the memory card writer 107.

The user obtains music data from a contents provider on the Internet using the above system and the following procedure.

First, the user downloads a desired music content into a hard disk in the PC 102 via the communication line 101. However, since the music content has been encrypted, the user is required to execute a certain procedure to play the obtained music content on the PC 102.

To play the obtained music content, the user needs to pay the charge to the contents provider using a credit card or the like beforehand. When the user pays the charge, the user receives a password and rights information from the contents provider. The password is a key used by the user to decrypt the encrypted music content. The rights information shows various conditions in which the user is allowed to play the content on the PC, such as the number of permitted plays, the number of permitted writings to the memory card, an expiration date indicating a period permitted for the user to play the content.

After having obtained the password and the rights information, the user, when intending to output the music from the speakers 106 of the PC 102, inputs the password through the keyboard 104 to the PC 102 while a dedicated application program (hereafter referred to as application) having a copyright protection function is running on the PC 102. The application then checks the rights information, decrypts the encrypted music content using the password, plays the decrypted music content to output the sounds from the speakers 106.

When the rights information indicates that the content is permitted to be written to the memory card, the application can write the encrypted music data, password, and rights information to the memory card 109.

Figure 2:
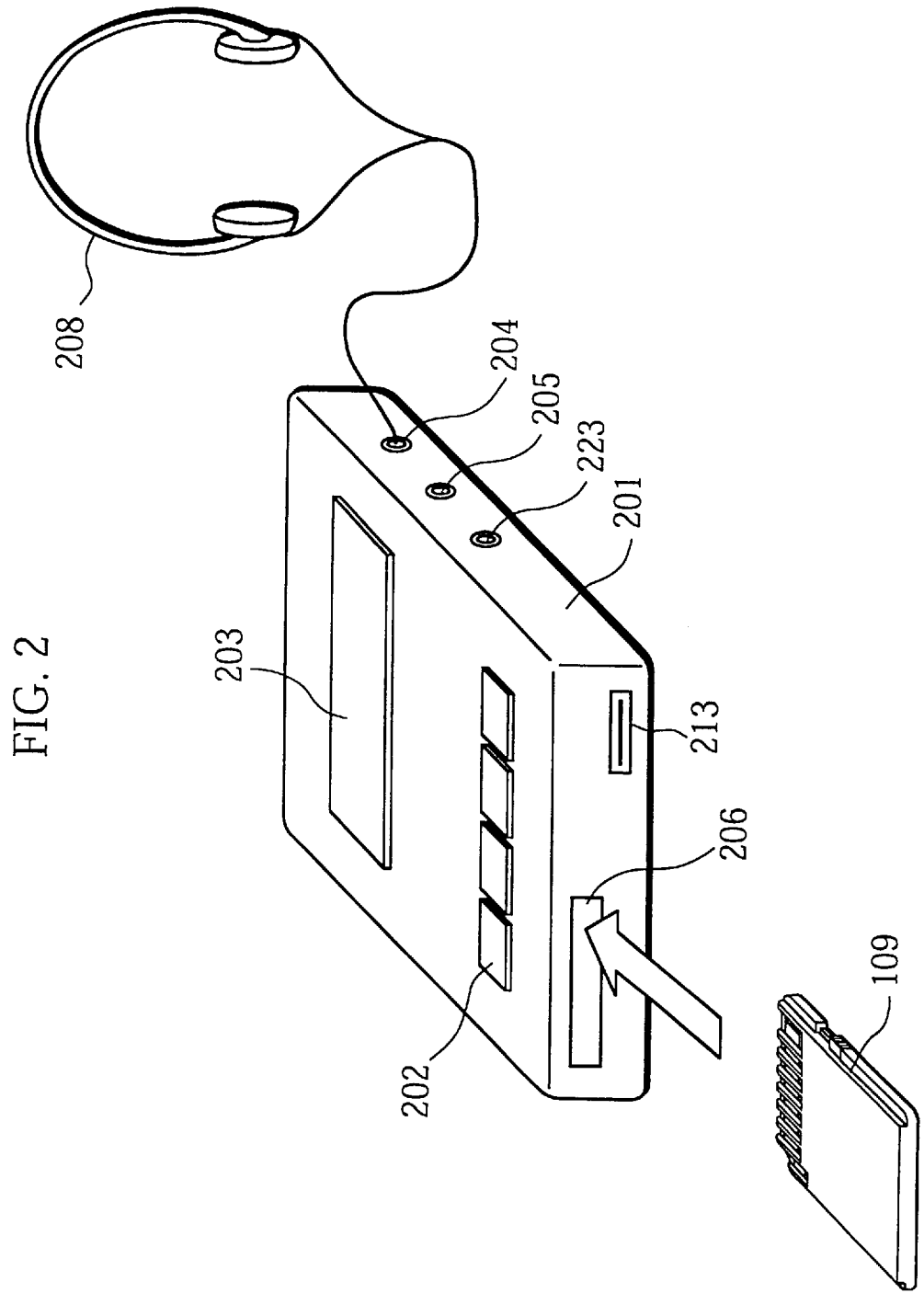
FIG. 2 shows the appearance of a portable player for which the semiconductor memory card is used as a recording medium.

FIG. 2 is a schematic representation of a portable copy/play apparatus (hereafter referred to as player) 201 for which the memory card 109 is used as a recording medium.

On the upper surface of the player 201, a liquid crystal display unit 202 and operation buttons 203 are formed. On the front side of the player 201, a memory card insertion slot 206 and a communication port 213 are formed, where the memory card 109 is inserted into the memory card insertion slot 10 206, and the communication port 213 is achieved by USB (Universal Serial Bus) or the like and connects to the PC 102. On a side of the player 201, an analog output terminal 204, a digital output terminal 205, and an analog input terminal 223 are formed.

The player 201, after the memory card 109 storing music data, a password, and rights information is loaded into the player 201, checks the rights information. When the music is permitted to be played, the player 201 reads out the music data, decrypts the read-out music data, converts the decrypted music content into an analog signal, and outputs the sounds of the analog signal through headphones 208 connected to the analog output terminal 204. Alternatively, the player 201 outputs digital data of the music data to the digital output terminal 205.

The player 201 can also convert an analog audio signal, which is input to the analog input terminal 223 of the player 201 through a microphone or the like, into digital data and stores the digital data in the memory card 109. The player 201 can also download music, data, a password, and rights information from the PC 102 via the communication port 213 and record the downloaded information to the memory card 109. That is to say, the player 201 can replace the PC 102 and the memory card 109 and playing the music data recorded on the memory card 109.

Figure 3:
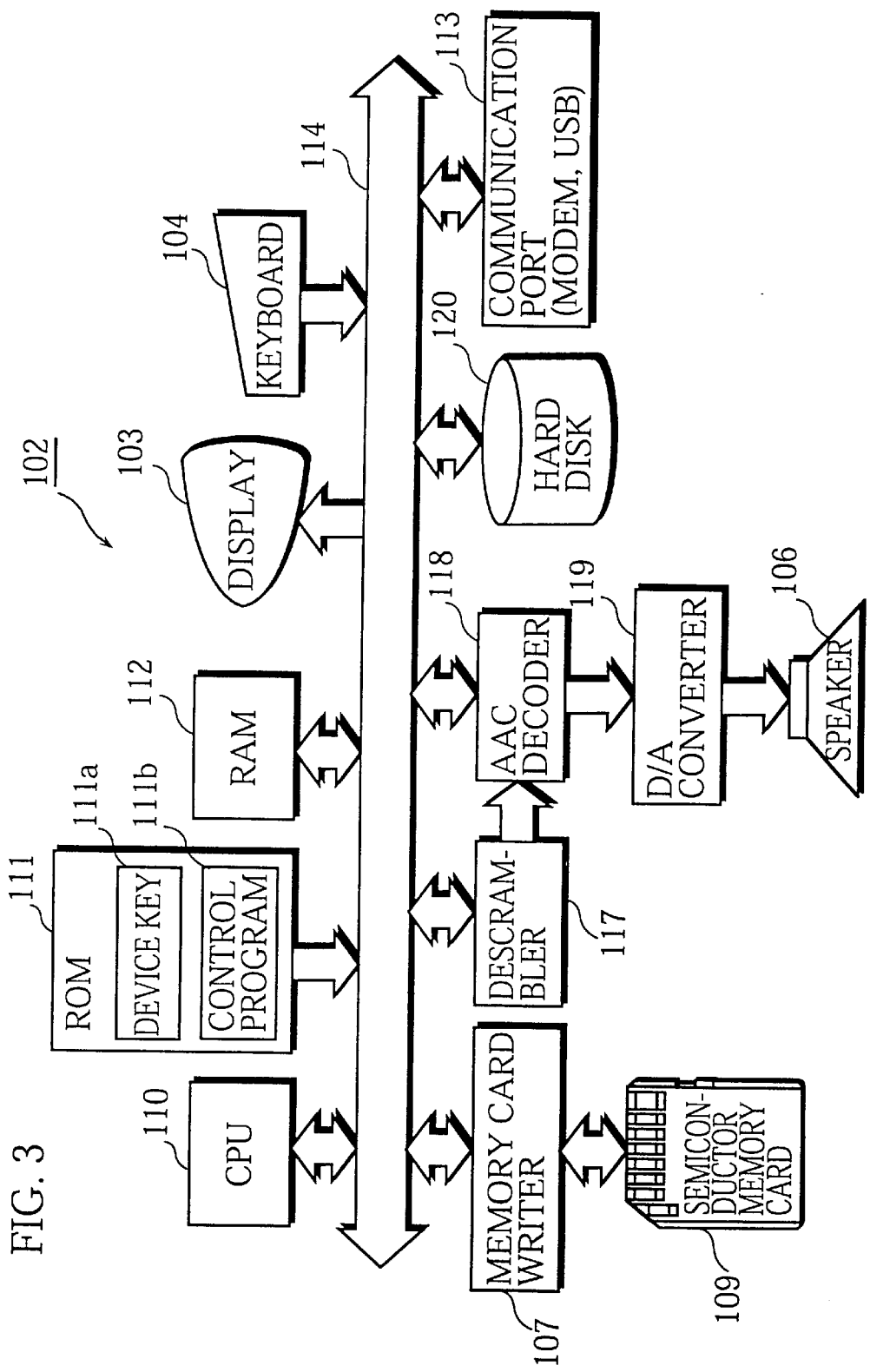
FIG. 3 is a block diagram showing the hardware construction of the PC.

FIG. 3 is a block diagram showing the hardware construction of PC 102.

The PC 102 includes a CPU 110, a ROM 111 prestoring a device key 111*a* and a control program 111*b*, a RAM 112, the display 103, a communication port 113 including a modem port used for connection to the communication line 101 and an USB used for connection to the player 201, the keyboard 104, an internal bus 114, the memory card writer 107 connecting the memory card 109 and the internal bus 214, a descrambler 117 for descrambling the encrypted music data read out from the memory card 109, an AAC decoder 118 conforming to MPEG2-AAC (IS013818-7) standard for decoding the descrambled music data, a D/A converter 119 for converting the decoded digital music data into an analog audio signal, the speakers 106, and a hard disk 120 storing a file management software program and an application.

The PC 102 can perform the following:
(1) use the memory card 109 as an auxiliary storage apparatus having an independent file system (e.g., ISO9293) as hard disks have by executing the file management software program stored in the hard disk 120;
(2) download music contents of the like from the communication line 101 via the modem port of the communication port 113 by executing the dedicated application stored in the hard disk 120;
(3) store the music contents or the like in the memory card 109 after a mutual authentication; and (4) read out the music contents or the like from memory card 109 and output the read-out contents to the speakers 106 for playing.

The device key 111*a* stored in the ROM 111 is a secret key unique to the PC 102 and is, as will be described later, used for the mutual authentication or the like.

Figure 4:
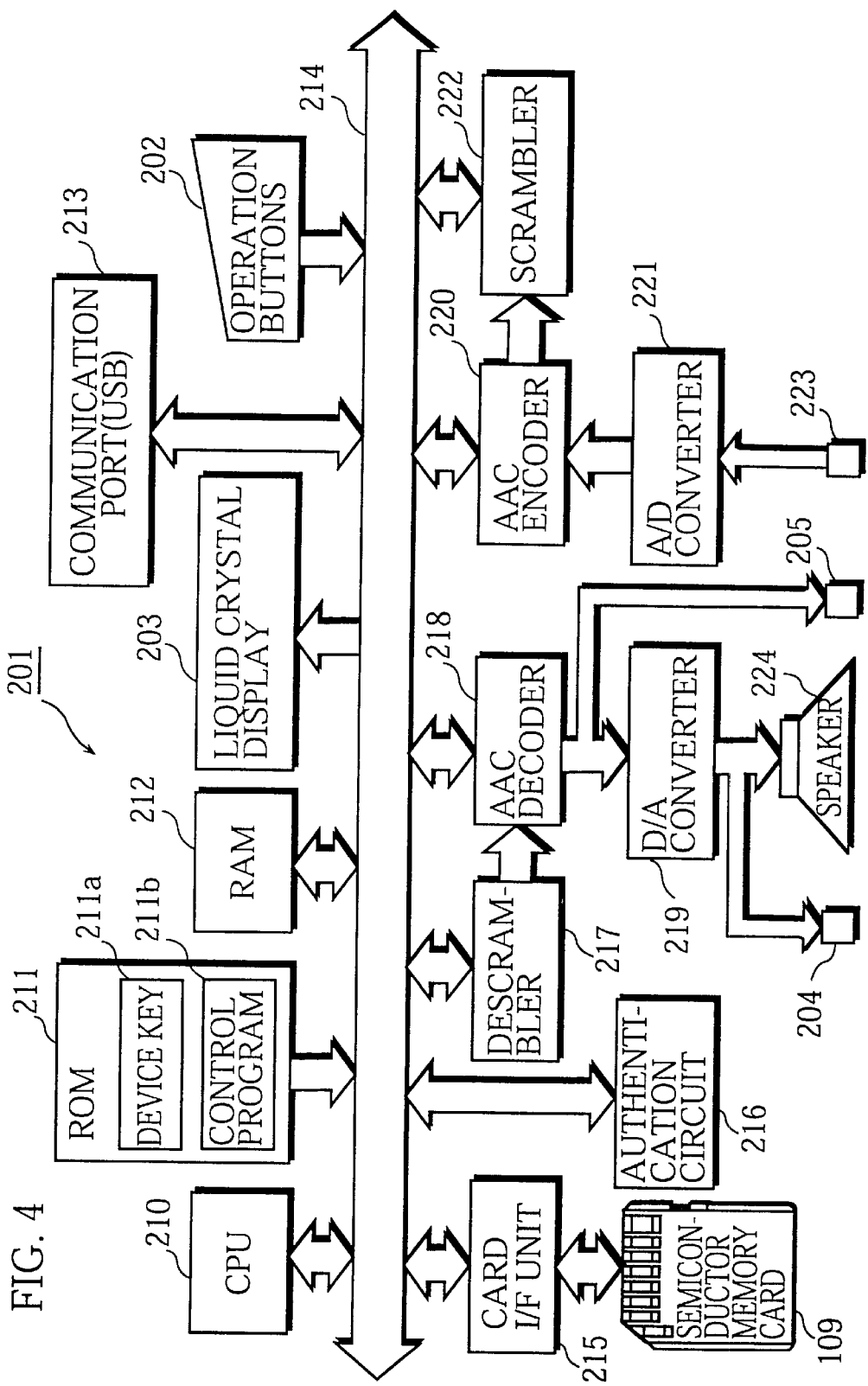
FIG. 4 is a block diagram showing the hardware construction of the player.

FIG. 4 is a block diagram showing the hardware construction of the player 201.

The player 201 includes a CPU 210, a ROM 211 prestoring a device key 211*a* and a control program 211*b*, a RAM 212, a liquid crystal display unit 203, a communication port 213 achieved by an USB or the like used for connection to the PC 102, operation buttons 202, an internal bus 214, a card I/F unit 215 connecting the memory card 109 and the internal bus 214, an authentication circuit 216 for executing a mutual authentication with the memory card 109, a descrambler 217 for descrambling the encrypted music data read out from the memory card 109, an AAC decoder 218 conforming to MPEG2-AAC (ISO13818-7) standard for decoding the descrambled music data, a D/A converter 219 for converting the decoded digital music data into an analog audio signal, speakers 224, an A/D converter 221 for converting an analog audio signal input from the analog input terminal 223 into digital music data, an AAC encoder 220 conforming to MPEG2-AAC (ISO13818-7) standard for encoding the digital music data, a scrambler 222 for scrambling the encoded music data, an analog output terminal 204, a digital output terminal 205, and an analog input terminal 223.

The player 201 loads the control program 211*b* from the ROM 211 into the RAM 212 to allow the CPU 210 to execute the control program 211*b*. By doing this, the player 201 can read out music contents from the memory card 109, play and output the read-out music contents to the speakers 224 and can also store music contents input via the analog input terminal 223 and communication port 213 into the memory card 109. That is to say, the user can use the player 201 not only for copying and playing music personally as with ordinary players, but also for copying and playing such music contents (protected by copyright) as are distributed by an electronic music distribution system and downloaded by the PC 102.

Figure 5:
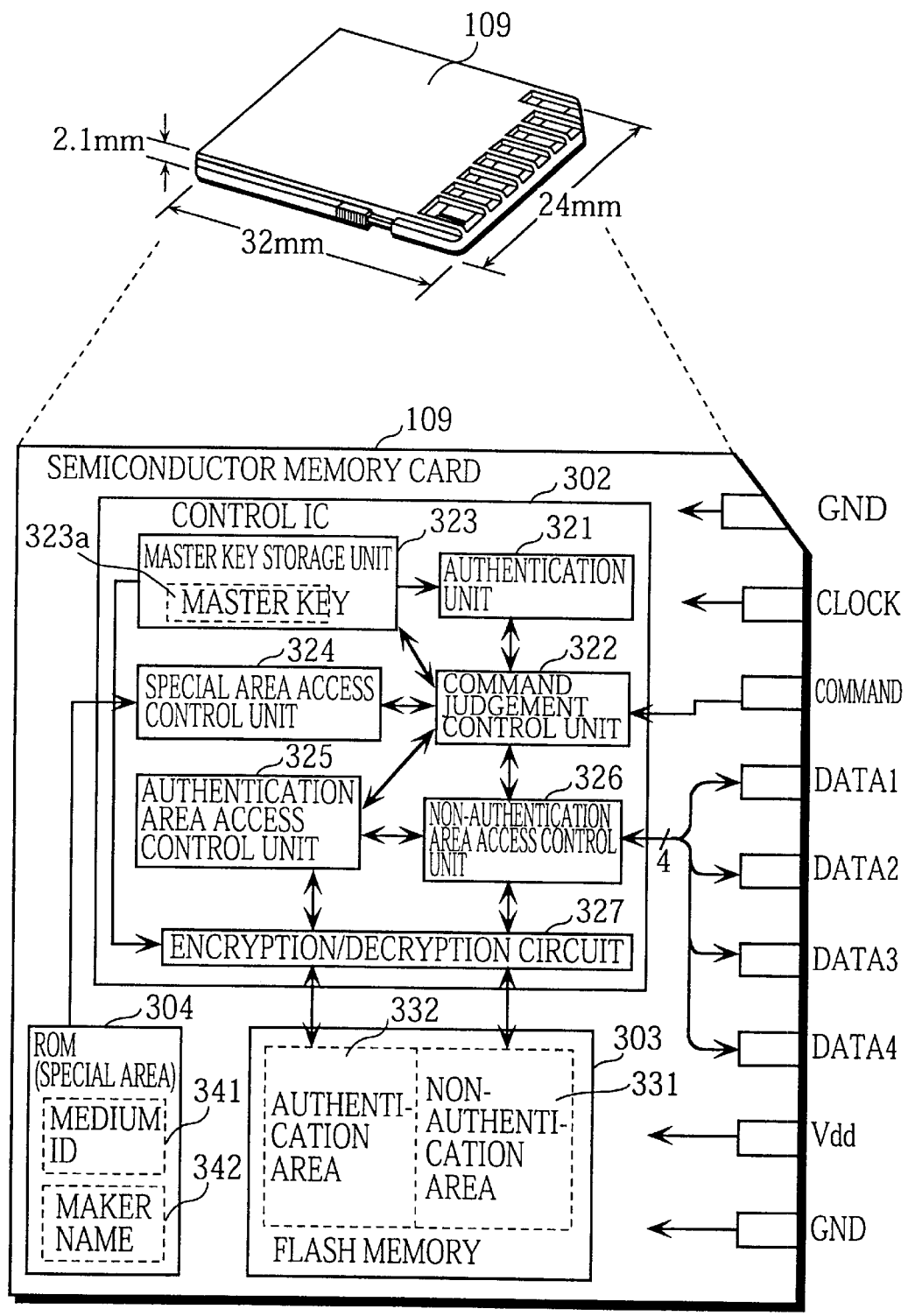
FIG. 5 shows the appearance and hardware construction of the semiconductor memory card.

FIG. 5 shows the appearance and hardware construction of the memory card 109.

The memory card 109 contains a rewritable nonvolatile memory to which data can be written repeatedly. The rewritable nonvolatile memory has capacity of 64 MB, and is driven by power supply voltage of 3.3V and a clock signal supplied from external sources. The memory card 109 is a 2.1 mm-thick, 24 mm-wide, and 32 mm-deep rectangular parallelopiped. The memory card 109 is provided with a write-protect switch on its side, and is electrically connected to an external apparatus via a 9-pin connection terminal formed at an end of the memory card 109.

The memory card 109 contains three IC chips: a control IC 302, a flash memory 303, and a ROM 304.

The flash memory 303 is a flash-erasable, rewritable nonvolatile memory of a block deletion type, and includes logical storage areas: an authentication area 332 and a non-authentication area 331. The authentication area 332 can be accessed only by the apparatuses that have been authenticated as proper apparatuses. The non-authehtication area 331 can be accessed by any apparatuses whether they are authenticated or not. In the present embodiment, the authentication area 332 is used for storing important data related to copyright protection, and the non-authentication area 331 is used as an auxiliary storage apparatus in a typical computer system. Note that a certain address in the flash memory 303 is used as a boundary between these two storage areas.

The ROM 304 includes a storage area which is a read-only area and is called special area. The special area prestores information including: a medium ID 341 which is an identifier of the memory card 109; and a maker name 342 which indicates the name of the manufacture of the memory card 109. Note that the medium ID 341 is unique to the memory card 109 and discriminates the memory card 109 from the other semiconductor memory cards and that the medium ID 341 is used for the mutual authentication between apparatuses and used for preventing an unauthorized access to the authentication area 332.

The control IC 302 is a control circuit composed of active elements (logic gates and the like), and includes an authentication unit 321, a command judgement control unit 322, a master key storage unit 323, a special area access control unit 324, an authentication area access control unit 325, a non-authentication area access control unit 326, and an encryption/decryption circuit 327.

The authentication unit 321 is a circuit that performs a challenge-response-type mutual authentication with a remote apparatus attempting to access the memory card 109. The authentication unit 321 includes a random number generator and an encryption unit, and authenticates the remote apparatus as a proper one when having confirmed that the remote apparatus has the same encryption unit as the local apparatus. Note that in the challenge-response-type mutual authentication, the two apparatuses in communication perform the following: the local apparatus first sends challenge data to the remote apparatus, the remote apparatus in return generates response data by processing the received challenge data for certifying the properness of the remote apparatus and sends the generated response data to the local apparatus is proper by comparing the challenge data with the response data.

The command judgement control unit 322 is a controller composed of a decoding circuit and control circuit. The decoding circuit identifies a command (an instruction to the memory card 109) input via a command pin and executes the identified command. The command judgement control unit 322 controls the components 321 to 327 in accordance with the received commands.

The commands received by the command judgement control unit 322 includes not only commands to read, write, and delete data from/into the flash memory 303, but commands to control the flash memory 303 (commands related to an address space, not-deleted data, etc.).

For example, in relation to reading/writing data, the SecureRead address count command and the SecureWrite address count command are defined as commands for accessing the authentication area 332, and the Read address count command and the Write address count command are defined as commands for accessing the non-authentication area 331. In the above commands, "address" is a serial number of the first sector of a sequence of sectors from/on which data is read or written by the command. "Count" is the total number of sectors from/on which data is read or written by the command. "Sector" is a unit representing the amount of data read or written from/to the memory card 109. In the present embodiment, one sector is 512 bytes.

The master key storage unit 323 prestores a master key 323a which is used by the remote apparatus during the mutual authentication and is used to protect data in the flash memory 303.

The special area access control unit 324 is a circuit for reading out information such as the medium ID 341 from the special area (ROM) 304.

The authentication area access control unit 325 and the non-authentication area access control unit 326 are circuits for reading/writing data from/to the authentication area 332 and the non-authentication area 331, respectively. Each of the units 325 and 326 sends/receives data to/from external apparatuses (the PC 102, the player 201, etc.) via four data pins.

It should be noted here that the access control units 325 and 326 each contains a buffer memory as large as one block (32 sectors, or 16K bytes), and logically, inputs/outputs data in units of sectors to/from the area 332 or 331 in response to a command issued from an external apparatus, although it inputs/outputs data in units of blocks when the flash memory 303 is rewritten. More specifically, when a sector in the flash memory 303 is to be rewritten, the access control unit 325 or 326 reads out data from a block including the sector from the flash memory 303, deletes the block in the flash memory 303 at once, rewrites the sector in the buffer memory, then writes the block of data including the rewritten sector to the flash memory 303.

The encryption/decryption circuit 327 is a circuit which performs encryption and decryption using the master key 323a stored in the master key storage unit 323 under the control of the authentication area access control unit 325 under the control of the authentication area access control unit 325 and the non-authentication area access control unit 326. The encryption/decryption circuit 327 encrypts data before writing the data to the flash memory 303, and decrypts the data after reading out the data from the flash memory 303. These encryption and decryption are performed to prevent unauthorized acts such as an act of disassembling the memory card 109, analyzing the contents of the flash memory 303 directly, and stealing the password from the authentication area 332.

It should be noted here the control IC 302 includes a synchronization circuit, a volatile storage area, and a non-volatile storage area as well as the main components 321 to 327. The synchronization circuit generates an internal clock signal in synchronization with a clock signal supplied from a clock pin, and supplies the generated internal clock signal to each component.

Also, to protect the information stored in the special area (ROM) 304 against tampering by unauthorized persons, the special area (ROM) 304 may be embedded in the control IC. Alternatively, the information may be stored in the flash memory 303. In this case, the special area access control unit 324 may impose a limitation on writing data to the information, or the encryption/decryption circuit 327 may encrypt the information before the information is stored in the flash memory 303.

Figure 6:
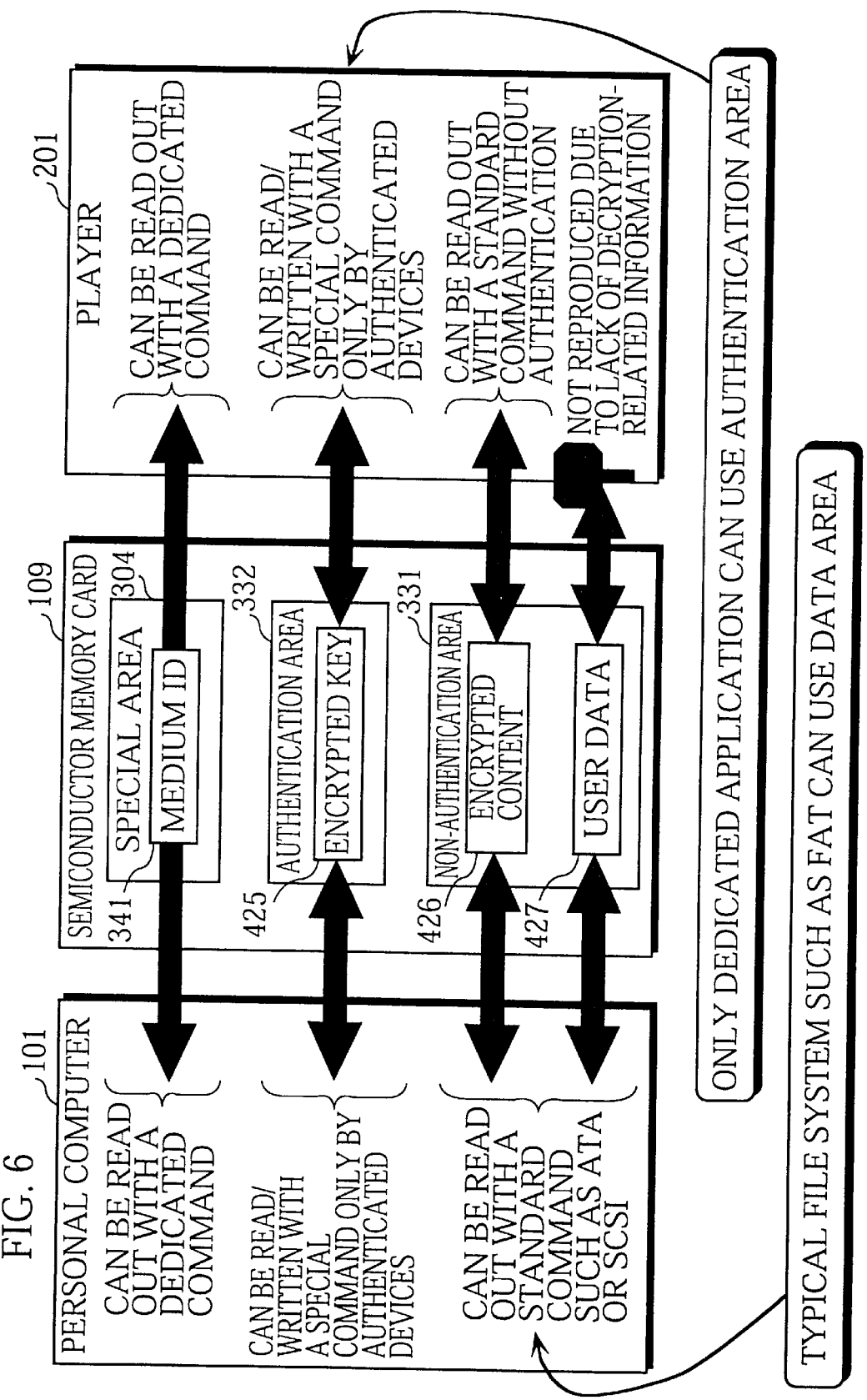
FIG. 6 shows various storage areas in the semiconductor memory card which can be recognized by the PC and the player.

FIG. 6 shows various storage areas in the memory card 109 which can be recognized by the PC 102 and the player 201. The storage areas in the memory card 109 are classified into three main areas: special area 304; authentication area 332; and non-authentication area 331.

The special area 304 is a read-only area. A dedicated command is used to read data from the special area 304. Reading/writing data from/to the authentication area 332 is possible only when the authentication between the PC 102 or the player 201 and the memory card 109 has been affirmative. An encrypted command is used to access the authentication area 332. The non-authentication area 331 can be accessed by commands on public use such as the commands conforming to the ATA (AT Attachment) or SCSI (Small Computer System Interface) standard. That is to say, data can be read/written from/to the non-authentication area 331 without an authentication process. Accordingly, a file management software program being a standard equipment on the PC 102 can be used to read/write data from/to the non-authentication area 331, as with a flash ATA or a compact flash.

The three main areas store the kinds of information shown below which provide the areas with a function as an auxiliary storage apparatus for a typical PC, and a function to copyright-protect the music data distributed by an electronic music distribution system.

The non-authentication area 331 stores an encrypted content 426, user data 427, etc. The encrypted content 426 is music data being an object of copyright protection and having been encrypted. The user data 427 is general data irrelevant to copyright protection. The authentication area 332 stores an encryption key 425 which is a secret key used for decrypting the encrypted content 426 stored in the non-authentication area 331. The special area 304 stores the medium ID 341 which is necessary for accessing the authentication area 332.

The PC 102 or the player 201 first reads out the medium ID 341 from the special area 304 in the memory card 109 loaded into itself, then extracts the encryption key 425 and the rights information from the authentication area 332 using the medium ID 341. When it is confirmed from the rights information that the encrypted content 426 stored in the non-authentication area 331 is permitted to be played, the encrypted content 426 can be read out and played while being decrypted with the encryption key 425.

Here, suppose that a user writes only the music data that has been obtained unlawfully or without authorization to the non-authentication area 331 in the memory card 109 using the PC 102 or the like, then attempts to play the music data from the memory card 109 loaded into the player 201. In this case, although the non-authentication area 331 in the memory card 109 stores the music data, no encryption key 425 or rights information corresponding to the music data is stored in the authentication area 3232. Therefore, the player 201 fails to play the music data. With such a construction in which when only a music content is copied to the memory card 109 without authorized encryption key or rights information, the music content cannot be played, unauthorized copying of digital contents is prevented.

Figure 7:
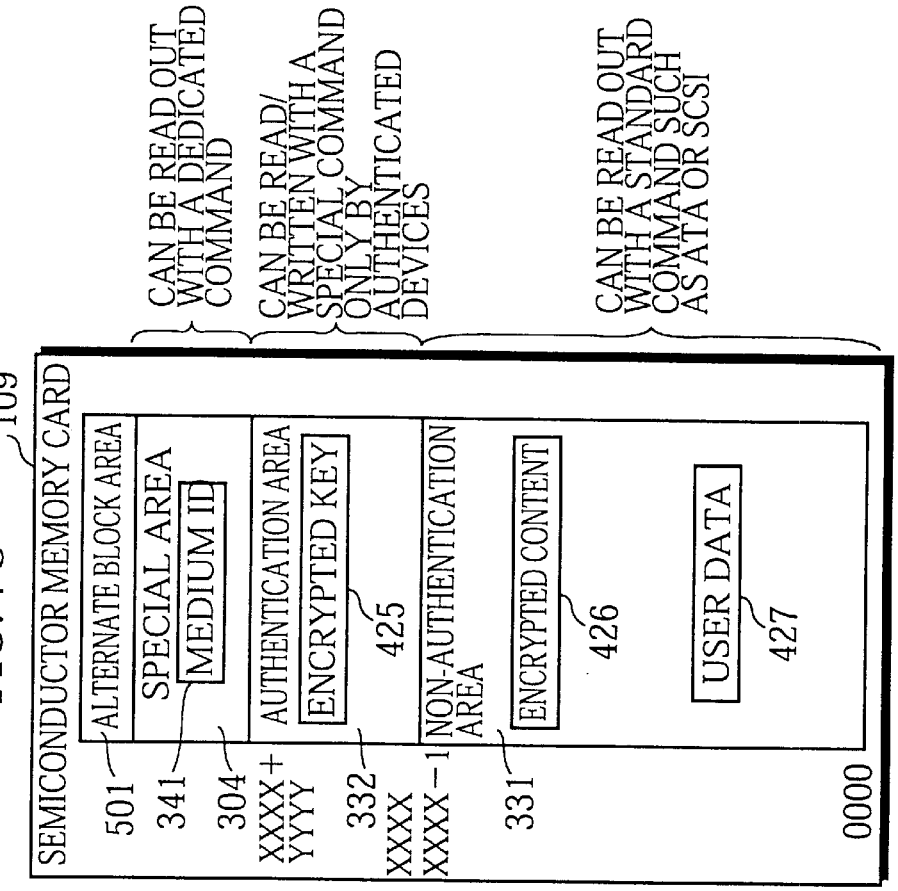
FIGS. 7A, 7B, and 7C show limitations and command formats when the PC or the player accesses an area in the semiconductor memory card, where

FIGS. 7A, 7B, and 7C show limitations and command formats when the PC 102 or the player 201 accesses an area in the memory card 109. FIG. 7A shows rules to be followed for accessing each area. FIG. 7B shows rules to be followed for changing the size of each area. FIG. 7C is a schematic representation of the areas in the memory card 109.

The special area 304 is a read-only area and can be accessed by a dedicated command without an authentication process. The medium ID 341 stored in the special area 304 is used to generate or decrypt the encrypted command which is used to access the authentication area 332. More specifically, the PC 102 or the player 201 reads out the medium ID 341, encrypts a command to be used to access the authentication area 332, and sends the encrypted command to the memory card 109. On receiving the encrypted command, the memory card 109 decrypts the encrypted command using the medium ID 341, interprets and executes the command.

The authentication area 332 can be accessed only when an authentication between an apparatus attempting to access the memory card 109 such as the PC 102 or the player 201 and the memory card 109 has been affirmative. The size of the authentication area 332 is equal to the size of (YYYY+1) sectors. That is to say, the authentication area 332 is composed of sector 0 to sector YYYY ($YY^{th}$ sector) logically, and is composed of sectors having $XXXX^{th}$ sector address to $(XXXX+YYYY)^{th}$ sector address in the flash memory 303, physically. Note that sector addresses are serial numbers assigned uniquely to all the sectors constituting the flash memory 303.

The non-authentication area 331 can be accessed by a standard command conforming to the ATA or SCSI standard. The size of the non-authentication area 331 is equal to XXXX sectors. That is to say, the non-authentication area 331 is logically and physically composed of sector 0 to $(XXXX-1)^{th}$ sectors.

It should be noted here that an alternate block area 501 may be allocated in the flash memory 303 beforehand. The alternate block area 501 is a group of alternate blocks which are used to replace defective blocks (blocks that have a defective storage area from/to which data cannot be read/written normally) in the authentication area 332 or the non-authentication area 331.

In the present embodiment, the special area 304 can be accessed without authentication. However, to prevent unlawful/unauthorized analysis by any persons, the special area 304 may be made accessible only by such apparatus as having been authenticated affirmatively, or commands used for accessing the special area 304 may be encrypted.

Now, changing the size of the authentication area 332 and the non-authentication area 331 will be described with reference to FIGS. 7B and 7C.

The total storage capacity of the authentication area 332 and the non-authentication area 33i in the flash memory 303 is equal to the capacity of (XXXX+YYYY+1) sectors which is a fixed value obtained by subtracting the alternate block area 501 and others from all the storage areas in the flash memory 303. The sizes of the areas 332 and 331 are each variable and can be changed by changing the boundary address value XXXX.

The first step in the procedure for changing the size of an area is to execute authentication. This authentication is executed to prevent any users from easily changing the size of the area using one of standard equipment programs prevalent among PC users or a software program intended for unlawful access. After the authentication is complete, the size of the non-authentication area 331 (the number of new sectors, XXXX) is sent to the memory card 109 using a dedicated command for changing the area size.

The memory card 109, on receiving the above dedicated command for changing the area size, stores the value XXXX in the nonvolatile storage area or the like in the memory card 109, then controls the succeeding accesses to the authentication area 332 and the non-authentication area 331 using the value XXXX as a new boundary address. More specifically, the memory card 109 assigns physical sector 0 to $XXXX^{th}$ sector in the flash memory 303 to the non-authentication area 331, and $XXXX^{th}$ to $(XXXX+YYYY)^{th}$ sector to the authentication area 332. The access control units 325 and 326 perform the address conversion between a logical address and a physical address, and monitors generation of an improper access to outside an allocated storage area. It should be noted here that logical addresses are recognized by an external apparatus as addresses in a data space of the memory card 109, corresponding to the values used in the commands, and that the physical addresses are addresses in a data space of the flash memory 303 contained in the memory card 109.

If the authentication area 332 is increased in size by reducing the boundary address, an arrangement will be required to maintain the logical compatibility between before and after the address change. For this purpose, all the data stored in the authentication area 332 are moved (copied) toward smaller addresses by the amount of reduction in the boundary address, for example. With this arrangement, physical addresses correspond to the new logical addresses starting from the new boundary address. With this arrangement, the data space of the authentication area 332 is enlarged while logical addresses for the data stored in the authentication area 332 are maintained.

The dedicated command for changing the area size may be encrypted before use to prevent unlawful/unauthorized accesses.

Figure 8:
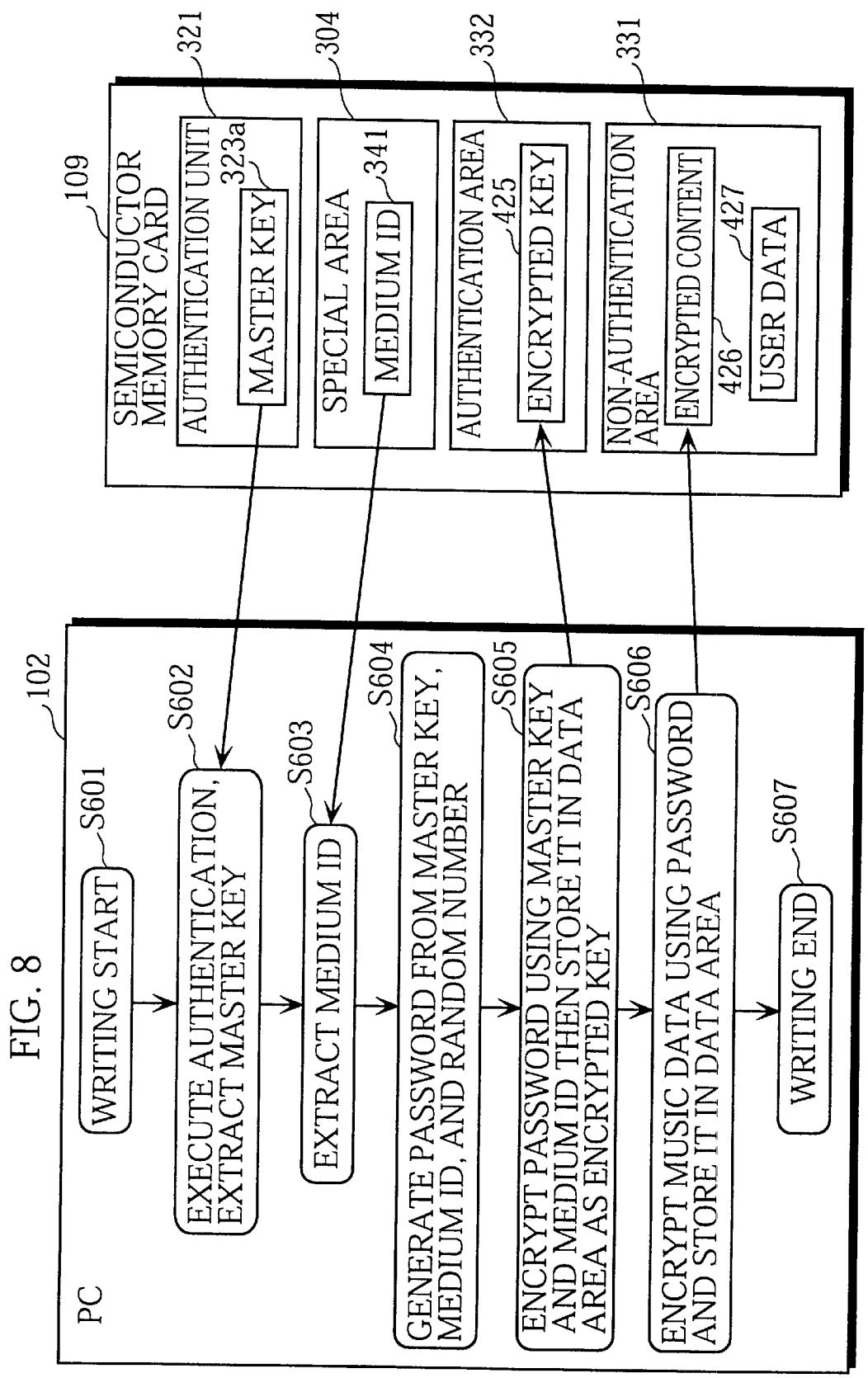
FIG. 8 is a flowchart showing a procedure in which the PC (or the player) writes a music content or the like to the semiconductor memory card.

FIG. 8 is a flowchart showing a procedure in which the PC 102 (or the player 201) writes a music content or the like to the memory card 109. In the following description, it is supposed that the PC 102 writes music data to the memory card 109 (S601).

(1) The PC 102 executes a challenge-response-type authentication with the authentication unit 321 of the memory card 109 using the device key 111a and the like, and extracts the master key 323a from the memory card 109 when the authentication has been affirmative (S602).

(2) The PC 102 then extracts the medium ID 341 from the special area 304 in the memory card 109 using a dedicated command (S603).

(3) The PC 102 then generates a random number, and generates a password, which is used for encrypting the music data, from the extracted master key 323a and the medium ID 341 (S604). In the above step, the random number is generated by, for example, encrypting the challenge data (random number) sent to the memory card 109 during the authentication process.

(4) The generated password is encrypted using the master key 323a and the medium ID 341, then is written to the authentication area 332 as the encryption key 425 (S605). By this time, before the data (encryption key 425) is transmitted, the command to write data to the authentication area 332 has been encrypted and sent to the memory card 109.

(5) The music data is encrypted using the password and stored in the non-authentication area 331 as the encrypted content 426 (S606).

Figure 9:
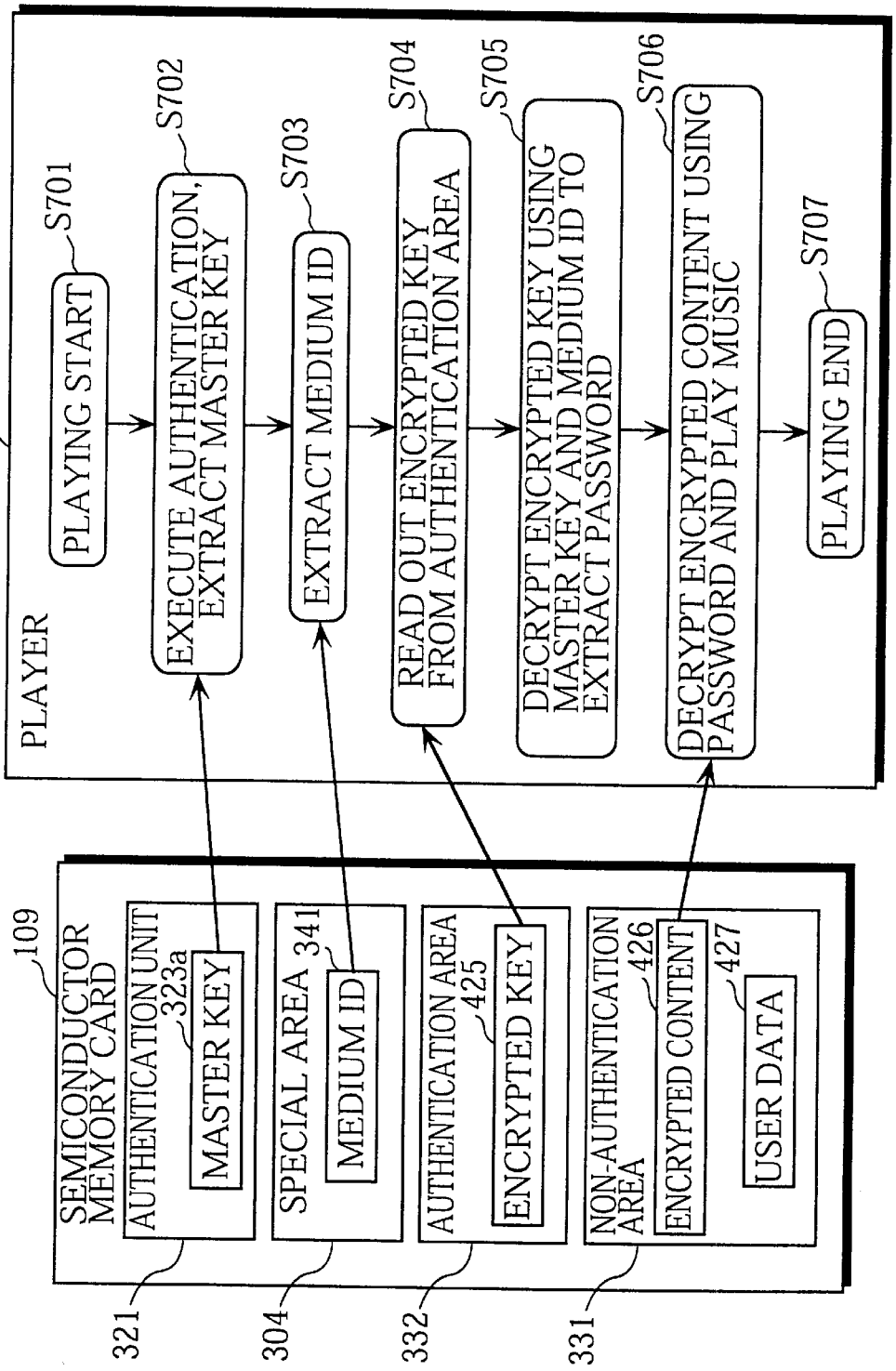
FIG. 9 is a flowchart showing a procedure in which a music content or the like is read out from the semiconductor memory card and played by the player (or the PC)

FIG. 9 is a flowchart showing a procedure in which a music content or the like is read out from the memory card 109 and played by the player 201 (or the PC 102). In the following description, it is supposed that music data stored in the memory card 109 is played by the player 201 (S701).

(1) The player 201 executes a challenge-response-type authentication with the authentication unit 321 of the memory card 109 using a device key 211a and the like, and extracts the master key 323a from the memory card 109 when the authentication has been affirmative (S702).
(2) The player 201 then extracts the medium ID 341 from the special area 304 in the memory card 109 using a dedicated command (S703).
(3) The player 201 then extracts the encryption key 425 of the music data from the authentication area 332 in the memory card 109 (S704). By this time, before the data (encryption key 425) is read out, the command to read out data from the authentication area 332 has been encrypted and sent to the memory card 109.
(4) The obtained encryption key 425 is decrypted using the master key 323a and the medium ID 341 to extract a password (S705). This decryption step is a reversed step of the encryption step S605 shown in FIG. 8.
(5) The encrypted content 426 is read out from the non-authentication area 331 and decrypted using the password extracted in the step S705, while the decrypted content is played as music (S706).

As described above, the music data stored in the non-authentication area 331 in the Memory card 109 cannot be decrypted without the encryption key 425 stored in the authentication area 332. Accordingly, even if only music data is unlawfully copied without authorization to another memory card, the copied music data cannot be normally played. With this construction, the copyright of the music data is safely protected.

As also described above, only apparatuses that have been authenticated affirmatively are permitted to access the authentication area in the memory card. This construction provides a copyright protection in which only the apparatuses that satisfy certain conditions are permitted to access the authentication area in the memory card. This is achieved by selectively using the device key, the encryption algorithm or the like that are used for authentication.

In the above example, when an encrypted content is written to the memory card 109, first the password used in the encryption is encrypted using the master key and the medium ID, then the encrypted password is stored in the authentication area 332 as the encryption key (S605). However, either the master key or the medium ID may be used to encrypt the password. This construction simplifies the encryption and provides a merit that the circuit size of the memory card 109 or the player 102 is reduced, although there is a possibility that the intensity of the encryption is weakened.

In the above example, the player 201 and the PC 102 can extract the master key 323a from the memory card 109 only when the authentication has been affirmative. However, the master key 323a may be embedded in the player 201 or the PC 102 beforehand. Alternatively, the master key 323a may be encrypted and stored in the special area 304 as an encrypted master key.

Now, two examples of the use of the authentication area of the memory card will be described. In the two examples, "the number of read-outs" and "the number of permitted digital outputs" are stored in the authentication area, respectively.

Figure 10:
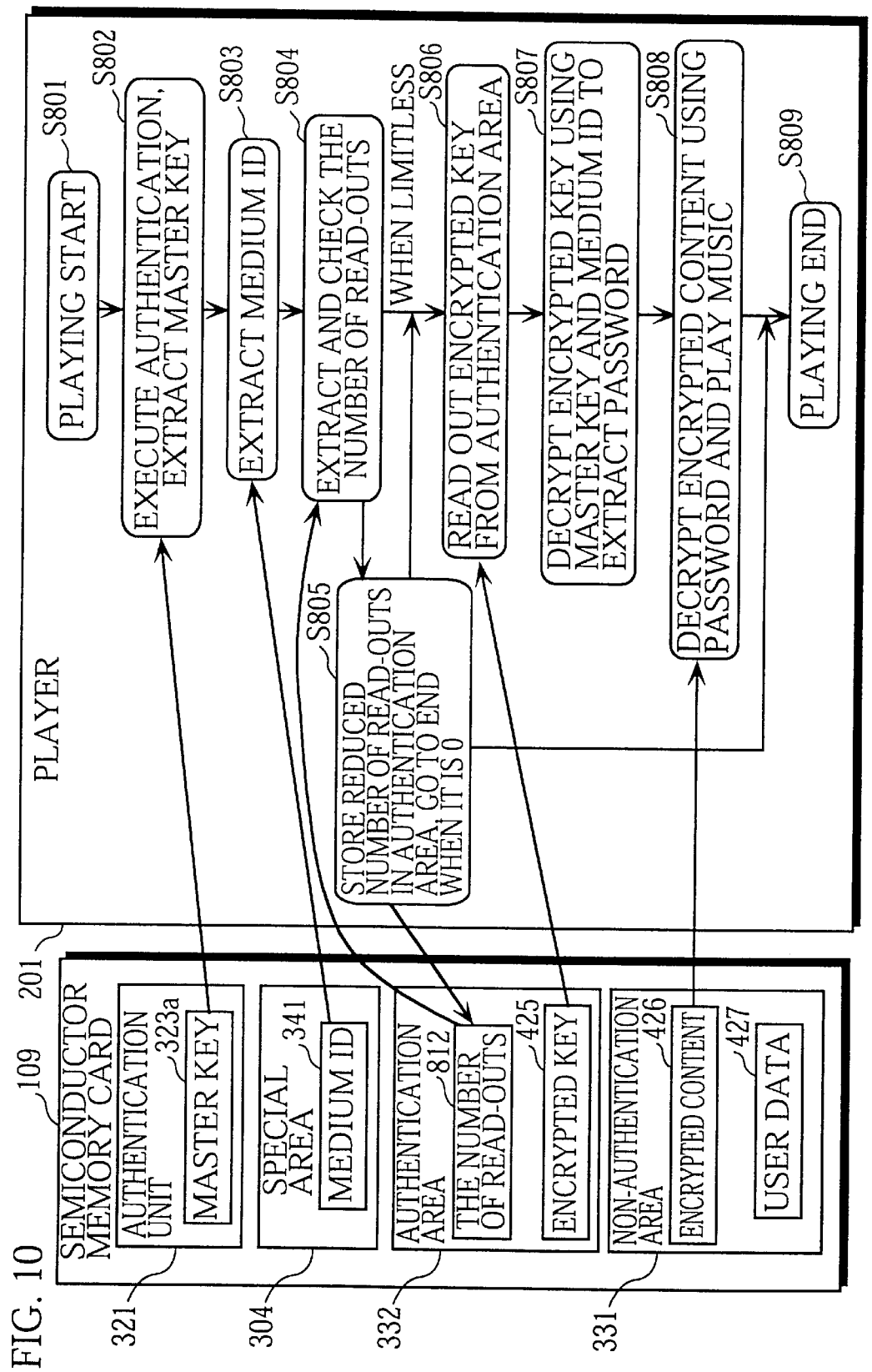
FIG. 10 is a flowchart showing the operation in which the player (or the PC) handles the number of read-outs stored in the authentication area in the semiconductor memory card.

FIG. 10 is a flowchart showing the operation in which the player 201 (or the PC 102) handles the number of read-outs 812 stored in the authentication area in the memory card 109. In the present example, the player 201 can play the music data stored in the non-authentication area 331 in the memory card 109 as an audio signal as many times as indicated by the number of read-outs 812 stored in the memory card 109 (S801).

(1) The player 201 executes a challenge-response-type authentication with the authentication unit 321 of the memory card 109 using a device key 211a and the like, and extracts the master key 323a from the memory card 109 when the authentication has been affirmative (S802).
(2) The player 201 then extracts the medium ID 341 from the special area 304 in the memory card 109 using a dedicated command (S803).
(3) The player 201 then extracts the encryption key 425 of the music data from the authentication area 332 in the memory card 109 (S804). By this time, before the data (encryption key 425) is read out, the command to read out data from the authentication area 332 has been encrypted and sent to the memory card 109.
(4) The player 201 then extracts the number of read-outs 812 from the authentication area 332 in the memory card 109, and checks the number of read-outs 812 (S804). When the number indicates allowance of limitless reading out, the player 201 plays the music in accordance with the procedure (S704 to S706) shown in FIG. 9 (S806 to S808).
(5) When the number of read-outs 812 is 0, it is judged that no reading out is allowed (S805), and the play process ends (S809). When the number of read-outs 812 is a value other than 0 and does not indicate allowance of limitless reading out, the player 201 reduces the number by one, writes the resultant number to the authentication area 332 (S805), then plays the music in accordance with the procedure (S704 to S706) shown in FIG. 9 (S806 to S808).

As described above, it is possible for the player 201 to control the number of times the player 201 plays the music by prestoring the number of read-outs 812 which shows the number of times the music can be played. This enables the present technique to be applied to analog reproduction of music obtained through, for example, rental CDs or kiosk terminals (online vending machines for music distribution connected to a communication network).

It should be noted here that "read-out time" may be stored instead of the number of read-outs 812 to impose a limitation on the total time the music content can be played. Alternatively, combined information of the number of times and a time may be stored instead. As another example, the number of read-outs 812 may be reduced when the content is kept to be played after a certain period (e.g., 10 seconds). As another example, the number of read-outs 812 may be encrypted then stored so that the information is protected from tampering.

Figure 11:
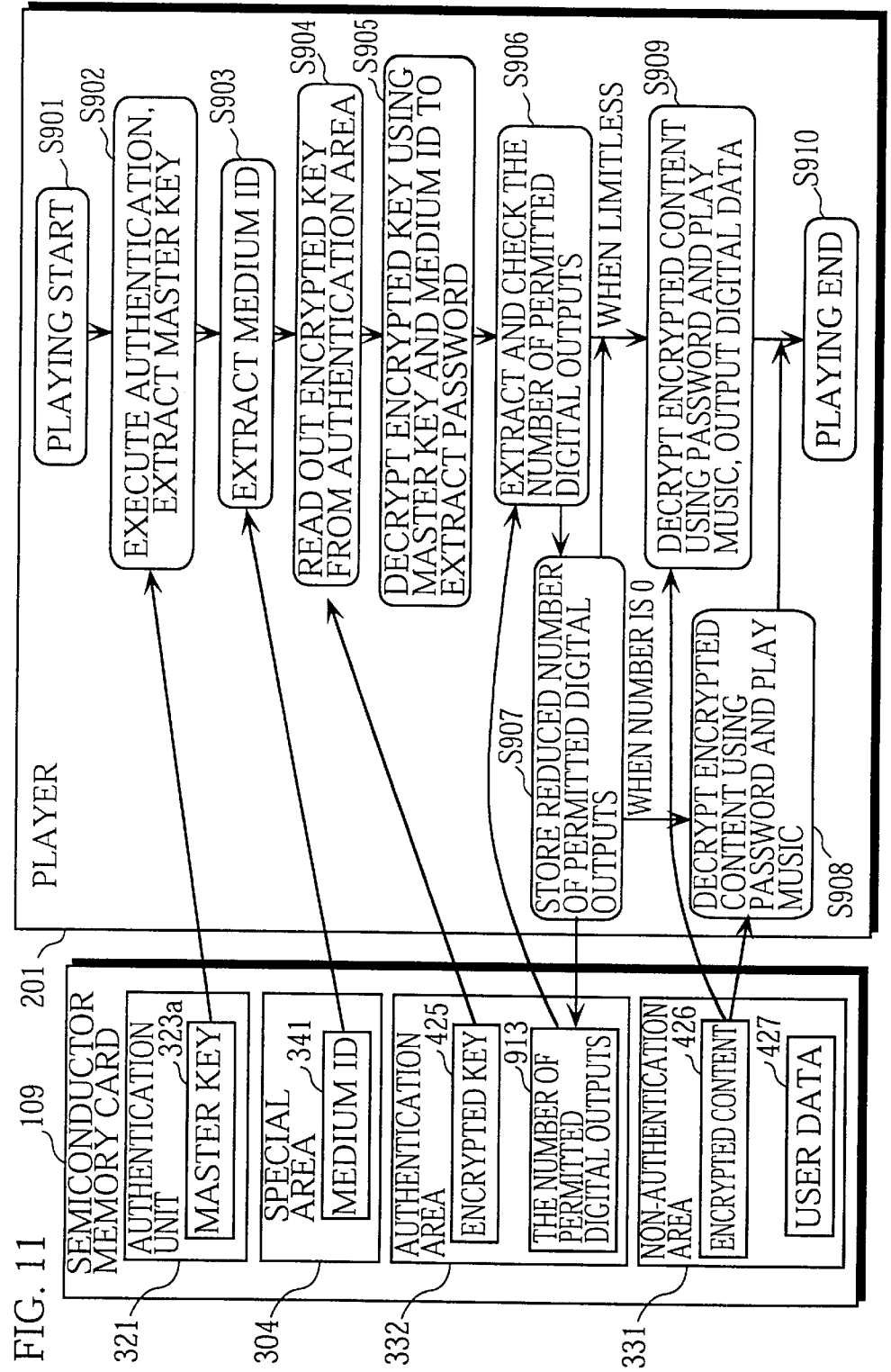
FIG. 11 is a flowchart showing the operation in which the player (or the PC) handles the number of permitted digital outputs stored in the authentication area in the semiconductor memory card.

FIG. 11 is a flowchart showing the operation in which the player 201 (or the PC 102) handles the number of permitted digital outputs 913 stored in the authentication area in the memory card 109. In the present example, the player 201 can read out the music data from the non-authentication area 331 in the memory card 109 and output the read digital music data as many times as indicated by the number of permitted digital outputs 913 stored in the memory card 109 (S901).

(1) The player 201, as in the steps S701 to S705 shown in FIG. 9, executes an authentication with the memory card 109 to extract the master key 323a (S902), extracts the medium ID 341 (S903), extracts the encryption key 425 (S904), and extracts a password (S905).

(2) The player 201 then extracts the number of permitted digital outputs 913 from the authentication area 332 in the memory card 109, and checks the number of permitted digital outputs 913 (S906). When the number indicates allowance of limitless digital output, the player 201 reads out the encrypted content 426 from the non-authentication area 331, and decrypts the encrypted content 426 to digital data using the password extracted in the step S905 and outputs the decrypted digital data from the digital output terminal 205 as digital music data (S909).

(3) When the number of permitted digital outputs 913 is 0, it is judged that no digital output is allowed (S908), and the data is played only by analog output (S908). More specifically, the encrypted content 426 is read out from the non-authentication area 331, and music is played while the content is decrypted using the password (S908).

(4) When the number of permitted digital outputs 913 is a value other than 0 and does not indicate allowance of limitless digital output, the player 201 reduces the number by one, writes the resultant number to the authentication area 332 (S907), then reads out the encrypted content 426 from the non-authentication area 331, decrypts the encrypted content 426 to digital data using the password extracted in the step S905 and outputs the decrypted digital data from the digital output terminal 205 (S909).

As described above, the number of digital outputs from the player 201 can be controlled by storing the number of permitted digital outputs 913 in the authentication area 332 in the memory card 109. This enables the present technique to be applied to digital reproduction of music obtained through, for example, rental CDs or kiosk terminals, which is to say, digital dubbing of music data stored in a memory card can be permitted a certain times in the authority of the copyright owner.

It should be noted here that as with "the number of read-outs", "permitted digital output time" may be stored instead of the number of permitted digital outputs 913 to impose a limitation on the total time digital data of the music content can be output. Alternatively, combined information of the number of permitted digital outputs and a time may be stored instead. As another example, the number of permitted digital outputs 913 may be reduced when the content is kept to be output after a certain period (e.g., 10 seconds). As another example, the number of permitted digital outputs 913 may be encrypted then stored so that the information is protected from tampering.

A function may be added so that the number of permitted digital outputs can be increased by a number which is specified by the copyright owner in correspondence to a charge the copyright owner receives.

Now, the physical data structure (structure of the sector and the ECC block) of the memory card 109 will be described.

The memory card 109 adopts such a data structure as is suitable for preventing unlawful/unauthorized acts related to the back up or restoration of the data stored in the flash memory 303 and for preventing unlawful/unauthorized acts related to the data tampering. Such a data structure is adopted due to the necessity for dealing with the unlawful operations that may be performed on the above methods in which "the number of read-outs" or "the number of permitted digital outputs" is stored in the authentication area 332 and the value is reduced each time the process is performed.

More specifically, the music may be repeatedly played after the whole data recorded in the flash memory 303 is backed up to an external auxiliary storage apparatus of the like. By doing this, when the number of permitted play operations becomes 0, the music can be repeatedly played again by restoring the back up data. Also, the music may unlawfully be played repeatedly without authorization by tampering the number of read-outs. As a result, it is necessary to make some arrangement to prevent such unlawful acts.

Figure 12:
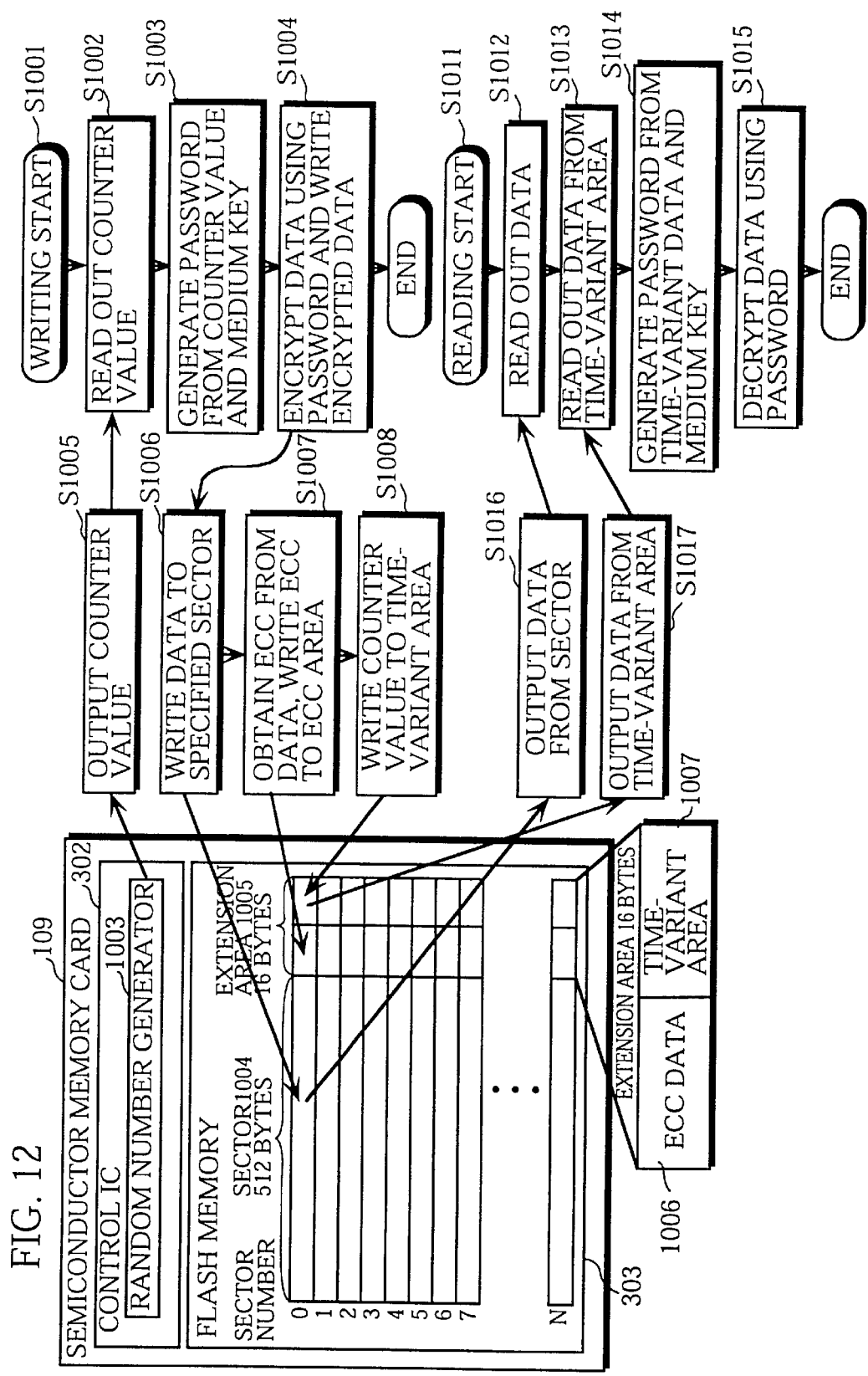
FIG. 12 shows a data structure which is common to the authentication and non-authentication areas of the semiconductor memory card, and also shows a flowchart of the reading/writing process corresponding to the data structure.

FIG. 12 shows a data structure which is common to the authentication and non-authentication areas 332 and 331 of the memory card 109, and also shows a flowchart of the reading/writing process corresponding to the data structure.

In the present example, the counter value generated by the random number generator 103 of the authentication unit 321 in the control IC 302 is used as a time-variant key.

A 16-byte extension area 1005 is assigned to each of 512-byte sectors 1004 in the flash memory 303. Each sector stores data which has been encrypted using the counter value. The extension area 1005 is composed of ECC data 1006 and a time-variant area 1007. The ECC (Error-Correcting Code) data 1006 is 8-byte data being an ECC for the encrypted data stored in the current sector. The time-variant area 1007 is 8-byte and stores a counter value used for generating the encrypted data stored in the current sector.

It should be noted here that only the sectors 1004 can be accessed logically (i.e., using a public command or the like), and that only the extension area 1005 can be accessed physically (i.e., controlled by an apparatus that reads/writes data from/to the memory card).

With the above construction, unlawful/unauthorized data tampering can be prevented by comparing the sector data with the contents of the time-variant area 1007, where even if the sector data is tampered using a command or the like, the contents of the time-variant area 1007 do not change.

More specifically, the PC 102 or the player 201 writes/reads data to/from the authentication area 332 or the non-authentication area 331 in the flash memory 109 following the procedure shown below in units of sectors 1004. First, the procedure in which the PC 102 writes data to the memory card 109 (S1001) will be described.

(1) The PC 102 requests the memory card 109 to issue a counter value. In response to this request, the control IC 302 in the memory card 109 generates a random number using a random number generator 1003 contained in the control IC 302 (S1005), and sends the generated random number to the PC 102 as the counter value (S1002).

(2) A password is generated from the received counter value and the master key 323a and the media ID 341 which have already been obtained (S1003).

(3) One sector of data to be written is encrypted using a password and sent to the memory card 109 (S1004). Together with the encrypted data, (i) information specifying the location of a sector to which the encrypted data is to be written, and (ii) the counter value used for the encryption are sent to the memory card 109.

(4) The memory card 109 writes the encrypted data to the specified sector 1004 (S1006).

(5) An ECC is obtained by calculation from the encrypted data, and the obtained ECC is written to the extension area 1005 as the ECC data 1006 (S1007).

(6) The counter value received together with the encrypted data is written to the time-variant area 1007 (S1008).

Next, the procedure in which the PC 102 reads out data from the memory card 109 (S1011) will be described.

(1) The PC 102 requests the memory card 109 to read out data by specifying the location of a sector from which the data is to be read out. On receiving the request, the memory card 109 first reads out encrypted data from the specified sector 1004 and outputs the read-out data to the PC 102 (S1016). The PC 102 receives the encrypted data (S1012).

(2) The memory card 109 then reads out a counter value from the time-variant area 1007 in the extension area 1005 corresponding to the specified sector 1004, and sends the read-out counter value to the PC 102 (S1017). The PC 102 receives the counter value (S1013).
(3) A password is generated from the read-out counter value and the master key 323a and the media ID 341 which have already been obtained (S1014).
(4) The encrypted data is decrypted using the password (S1005).

Here, if the data in the sector 1004 has been changed by tampering or the like, the decryption fails due to a mismatch between the counter value read out from the time-variant area 1007.

As described, above, the flash memory 303 contains the time-variant area 1007, a hidden area which cannot be seen (accessed) by users. Data is encrypted and stored using a password which is generated using a counter value stored in the time-variant area 1007. With this construction, the data is protected from unlawful/unauthorized tampering by users.

In the above example, the time-variant area 1007 is provided in the extension area 1005 for storing the ECC. However, it is possible to provide the time-variant area 1007 within another area in the flash memory 303 with a condition such that data stored in the area cannot be changed from outside the memory card.

In the above example, a random number is used as the counter value. However, the counter value may be a timer value indicating a time that changes every instant, or may be the number of times data has been written to the flash memory 303.

Now, a desirable example of a relationship between the logical addresses and physical addresses in the flash memory 303 will be described.

FIGS. 13A to 13D show a change in the relationship between the logical addresses and physical addresses. FIG. 13A shows the relationship before the change. FIG. 13B shows the relationship after the change. FIG. 13C shows a conversion table 1101 corresponding to FIG. A. FIG. 13D shows the conversion table 1101 corresponding to FIG. B.

The conversion table 1101 is a table in which all the logical addresses (in FIGS. 13A to 13D, serial numbers of the logical blocks) are stored with corresponding physical addresses (in FIGS. 13A to 13D, serial numbers of the physical blocks constituting the flash memory 303). The conversion table 1101 is stored in a nonvolatile area in the control IC 302 or the like and is referred to by the authentication area access control unit 325 or the non-authentication area access control unit 326 when, for example, a logical address is converted into a physical address.

Devices accessing the memory card 109 cannot write data to all the data storage spaces that physically exist in the memory card 109 (i.e., all the physical blocks constituting the flash memory 303), but can write data only to logical data spaces (logical blocks) that are specified by the logical addresses.

The above arrangement is made, for one reason, to secure an alternative area which would replace an area from/to which data cannot be read/written due to a partial defect of the flash memory 303. Even if such a defect block has been replaced by an alternative block, changing the conversion table so as to reflect the change in the correspondence between the logical and physical block numbers enables the flash memory 303 to pretend against external devices that no defects have been caused. This is because in each file, the logical continuity, which corresponds to a plurality of continuous physical blocks, is maintained.

However, the fragmentation of logical blocks increases when, for example, a file composed of a plurality of blocks is repeatedly stored or deleted in/from the memory card 109. A specific example of this is shown in FIG. 13A in which the logical addresses (0 and 2) of the logical blocks constituting "file 1" are discontinuous.

When such discontinuity of logical blocks occurs, for example, music data cannot be written to continuous logical areas in the memory card 109. This necessitates issuance of the write command "Write address count" for each block, resulting in reduction in the writing speed. Similarly, this necessitates issuance of the read command "Read address count" for each block even when music data of one tune is to be read out, making the real-time reproduction of the music data difficult.

To solve the above problem, the control IC 302 of the memory card 109 has a function to rewrite the conversion table 1101 based on a command issued from an external device. More specifically, when a dedicated command for rewriting the conversion table 1101 is input from a command pin, the control IC 302 of the memory card 109 interprets the dedicated command and rewrites the conversion table 1101 using a parameter that is sent after the dedicated command.

The above operation will be detailed using an example shown in FIGS. 13A to 13D. Suppose that before the above dedicated command is received, the flash memory 303 contains data constituting the file "file1" at locations indicated by physical addresses 0 and 2, and data constituting the file "file2" at a location indicated by physical address 1, as shown in FIG. 13A, and that the conversion table 1101 shows that the logical addresses match the physical addresses. That is to say, in the logical addresses, as well as in the physical addresses, the data of "file2" is sandwiched by the data of "file1".

With an intention of solving the above state, an external device sends the above dedicated command and a parameter to the flash memory 303, the dedicated command instructing to secure the continuity of "file1". The command judgement control unit 322 of the memory card 109, in accordance with the received dedicated command and parameter, rewrites the conversion table 1101 as shown in FIG. 13D. FIG. 13B shows the relationship between the logical and physical addresses in the flash memory 303 after the above sequence of operations.

As understood from FIG. 13B, though the arrangement of the physical blocks has not been changed, the logical blocks constituting "file1" have been relocated to be successive. With this arrangement, the external device can access "file1" at a higher speed than before in the next access and after.

The conversion table 1101 can be rewritten as above not only to solve the fragmentation of logical blocks, but also to change the size of each of the authentication area 332 and non-authentication area 331 in the flash memory 303. In the latter case, a high-speed area relocation is possible since the conversion table 1101 is rewritten so that a physical block to become small is located as a physical block to become large.

Now, a function of the memory card 109 related to not-deleted blocks will be described. More specifically, operations of the memory card 109 when receiving a not-deleted block list command and a delete command will be described. Here, the not-deleted blocks are physical blocks in the flash memory 303 which contain data that has not physically been deleted. That is to say, data in the not-deleted blocks needs to be deleted at once before the blocks are used next (before another data is written to the not-deleted blocks) in the not-deleted blocks needs to be deleted at once before the blocks are used next (before another data is written to the not-deleted blocks).

The not-deleted block list command is one of the commands the command judgement control unit 322 can interpret and execute, and is used to obtain a list of all the not-deleted blocks in the flash memory 303.

The existent data stored in the flash memory 303 of the memory card 109 must be deleted in units of blocks before data is newly written to the flash memory 303. The time for the deletion is approximately a half of the total time of writing. As a result, the total time of writing is reduced if the deletion has been completed beforehand. Accordingly, to achieve this, the memory card 109 provides the external device the not-deleted block list command and the delete command.

Figure 14A:
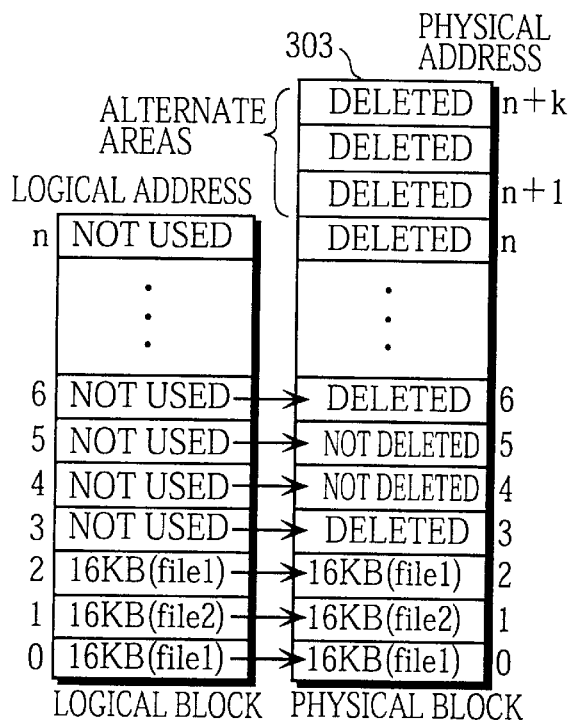
FIGS. 14A to 14D show functions related to not-deleted blocks in the semiconductor memory card, where

Suppose that the current use state of the logical blocks and physical blocks of the flash memory 303 is shown in FIG. 14A. As shown in FIG. 14A, logical blocks 0 to 2 are currently used, and physical blocks 0 to 2, 4, and 5 are not-deleted blocks.

A not-deleted block list 1203 is stored in the command judgement control unit 322 in the above state. The contents of the not-deleted block list 1203 corresponding to the use state of the blocks shown in FIG. 14A are shown in FIG. 14B. Here, the not-deleted block list 1203 is a storage table composed of entries corresponding to all the physical blocks constituting the flash memory 303 and having values which indicate the data deletion states (blocks whose data has been deleted are incidated by "0", and blocks whose data has not been deleted are incidated by "1") of the corresponding physical blocks under the control of the command judgement control unit 322.

Figure 14C:
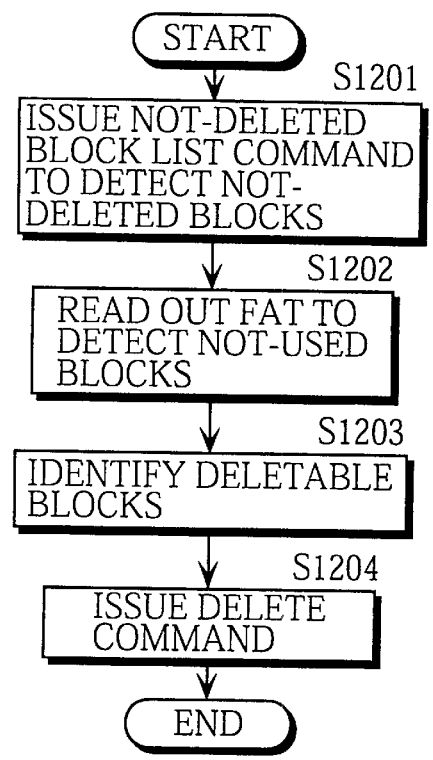
Figure 14B:
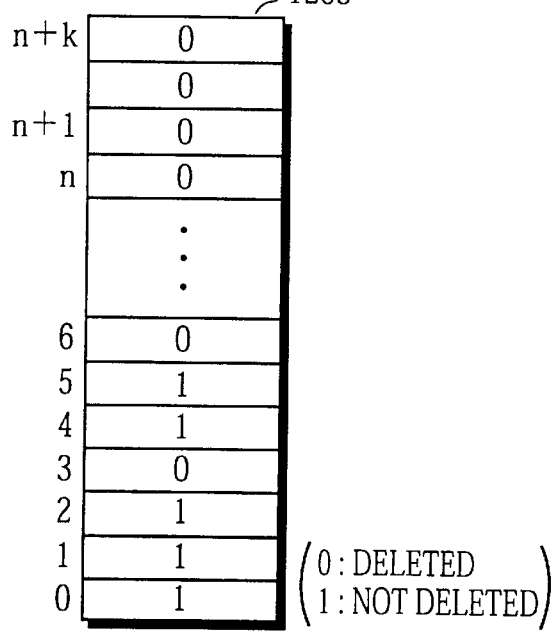

FIG. 14C is a flowchart showing the procedure of the PC 102 or the player 201 for deleting blocks beforehand using the not-deleted block list command and the delete command in the above-stated states. It is presumed here that the flash memory 303 contains a table such as FAT (File Allocation Table) which shows the use state of the logical blocks, as shown in FIG. 14D.

An external device such as the PC 102 or the player 201 issues the not-deleted block list command to the memory card 109 during an idle time in which the memory card 109 is not accessed (S1201). On receiving the command, the command judgement control unit 322 of the memory card 109 refers to the not-deleted block list 1203 contained in the command judgement control unit 322, detects that physical blocks 0 to 2, 4, and 5 are assigned a state value "1", and sends the physical block numbers to the external device.

Figure 14D:
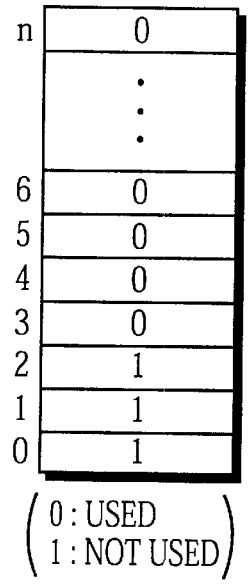

The external device then refers to the table that shows the use state of logical blocks in the flash memory 303 shown in FIG. 14D to identify the blocks that are not used logically (S1202).

The external device identifies, based on the information obtained in the steps S1201 and S1202, "deletable" blocks that are not used logically and have not been deleted physically (physical blocks 4 and 5 in the present example) (S1203). The external device then issues the delete command specifying the physical block numbers 4 and 5 to the memory card 109 (S1204). On receiving the command, the command judgement control unit 322 of the memory card 109 deletes the physical blocks 4 and 5 by sending instructions to the authentication area access control unit 325 and the non-authentication area access control unit 326.

After the above operation is complete, data is written to the physical blocks 4 and 5 at a high speed since the deletion process is not required for the writing.

Now, a function of the memory card 109 related to personal data protection will be described. More specifically, the personal data protection function is used when the memory card 109 checks an external device for authentication and requires personal data of the user of the external device. Here, each piece of the personal data is unique to a user and is used to identify the user. The user with proper personal data is recognized by the memory card 109 as an authorized user permitted to access the authentication area 332 in the memory card 109.

Here, if the user is requested to input the personal data each time the user accesses the authentication area 332, or if the input personal data is stored in the authentication area 332 for each of such accesses, a problem might occur that the personal data is tapped by someone or read unlawfully by another user who has an authority to access the authentication area 332.

One possible solution to this problem would be encrypting the personal data using a password provided by the user personally and storing the encrypted personal data, in the same way as music data.

However, in the above case, the user needs to input the password each time the personal data is checked. The procedure is troublesome and the management of the password is also required. Accordingly, the memory card 109 provides a function to sidestep the problem of unnecessarily and repeatedly inputting the personal data.

Figure 15:
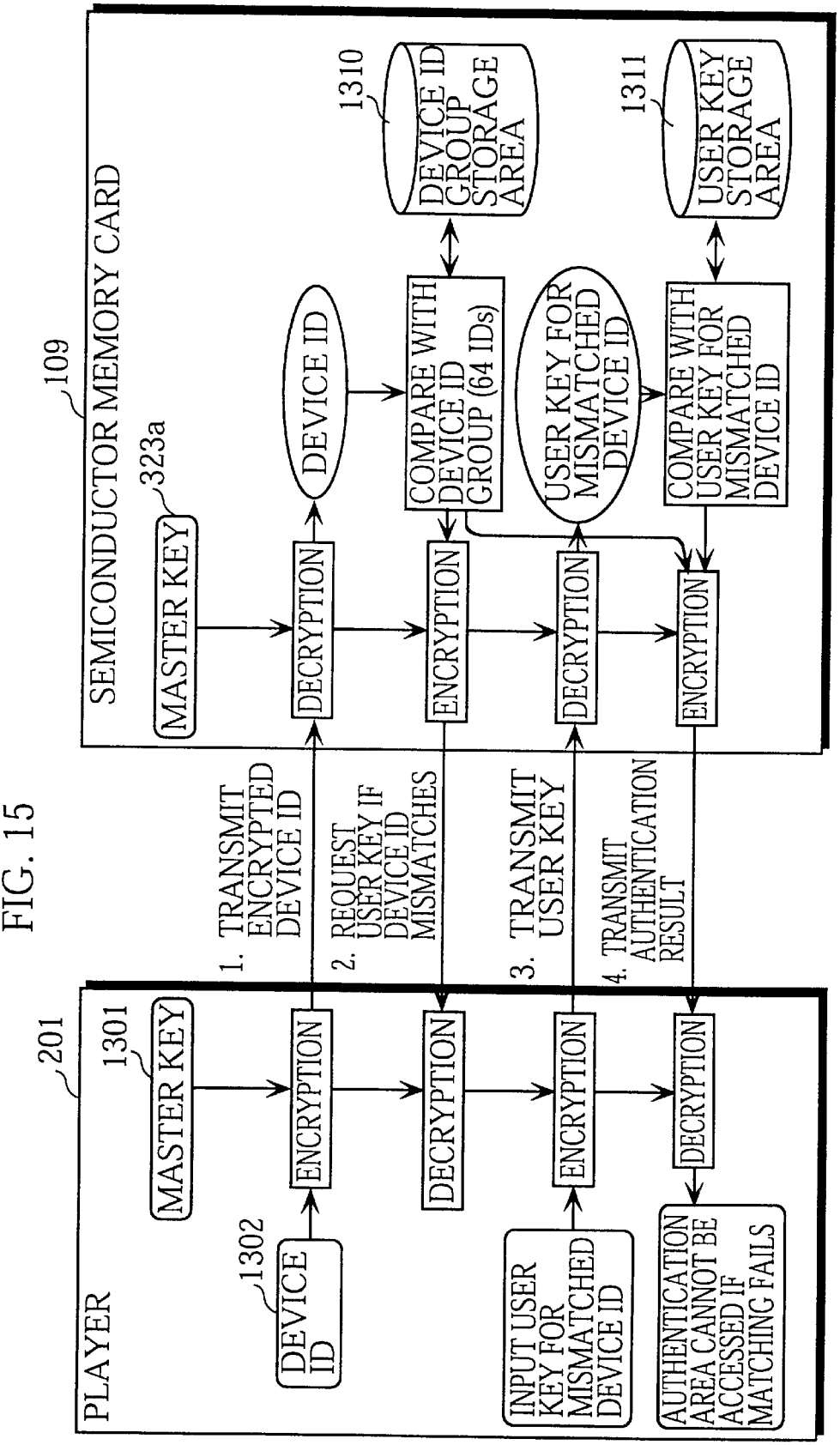
FIG. 15 shows a communication sequence in an authentication between the player and the semiconductor memory card and also shows main components used in the authentication.

FIG. 15 shows a communication sequence in an authentication between the player 201 and the memory card 109 and also shows main components used in the authentication. Note that the processes shown in FIG. 15 are mainly achieved by the authentication circuit 216 of the player 201 and the authentication unit 321 of the memory card 109.

As shown in FIG. 15, the authentication circuit 216 of the player 201 has the encryption and decryption functions, and also prestores a master key 1301 which is a secret key being equal to the master key 323*a* held by the memory card 109, and a device ID 1302 which is an ID unique to the player 201, such as a product serial number (s/n).

The authentication unit 321 of the memory card 109 has the encryption, decryption, and comparison functions, and also has two nonvolatile storage areas: a device ID group storage area 1310 and a user key storage area 1311. The device ID group storage area 1310 stores device IDs of all the devices permitted to access the authentication area 332 in the memory card 109. The user key storage area 1311 stores a user key sent from a device as personal data.

The authentication procedure will be described in detail below. Note that in the transmissions and receptions, all the data is encrypted before transmission, and the encrypted data is decrypted in the reception side. A key to be used in the encryption and decryption is generated during the following procedure.

(1) After the memory card 109 is connected to the player 201, first, the player 201 encrypts the device ID 1302 using the master key 1301, and sends the encrypted device ID 1302 to the memory card 109.

(2) The memory card 109 decrypts the received encrypted device ID 1302 using the master key 323*a*, and checks whether the obtained device ID 1302 has already been stored in the device ID group storage area 1310.

(3) When it is judged that the device ID 1302 has already been stored, the memory card 109 notifies the player 201 that the authentication has been affirmative. When it is judged that the device ID 1302 is not stored, the memory card 109 requests the player 201 to send a user key.

(4) The player 201 urges the user to input the user key, obtains the user key as personal data of the user, and sends the obtained user key to the memory card 109.

(5) The memory card 109 compares the received user key with the user key having been prestored in the user key storage area 1311. When having judged that the two user keys match, or when the user key storage area 1311 is vacant, the memory card 109 notifies the player 201 that the authentication has been affirmative, and stores the device ID 1302 obtained in the above step (3) in the device ID group storage area 1310.

With the above arrangement, when a device of the user is connected to the memory card 109 for the first time, the user is required to input personal data (a user key). However, in the second connection and after, the user is no longer requested to input the personal data since the authentication is automatically completed affirmatively using the device ID.

Now, a variation of the authentication protocol between the memory card 109 and an external device such as the PC 102 or the player 201 will be described with reference to FIGS. 16 and 17.

Figure 16:
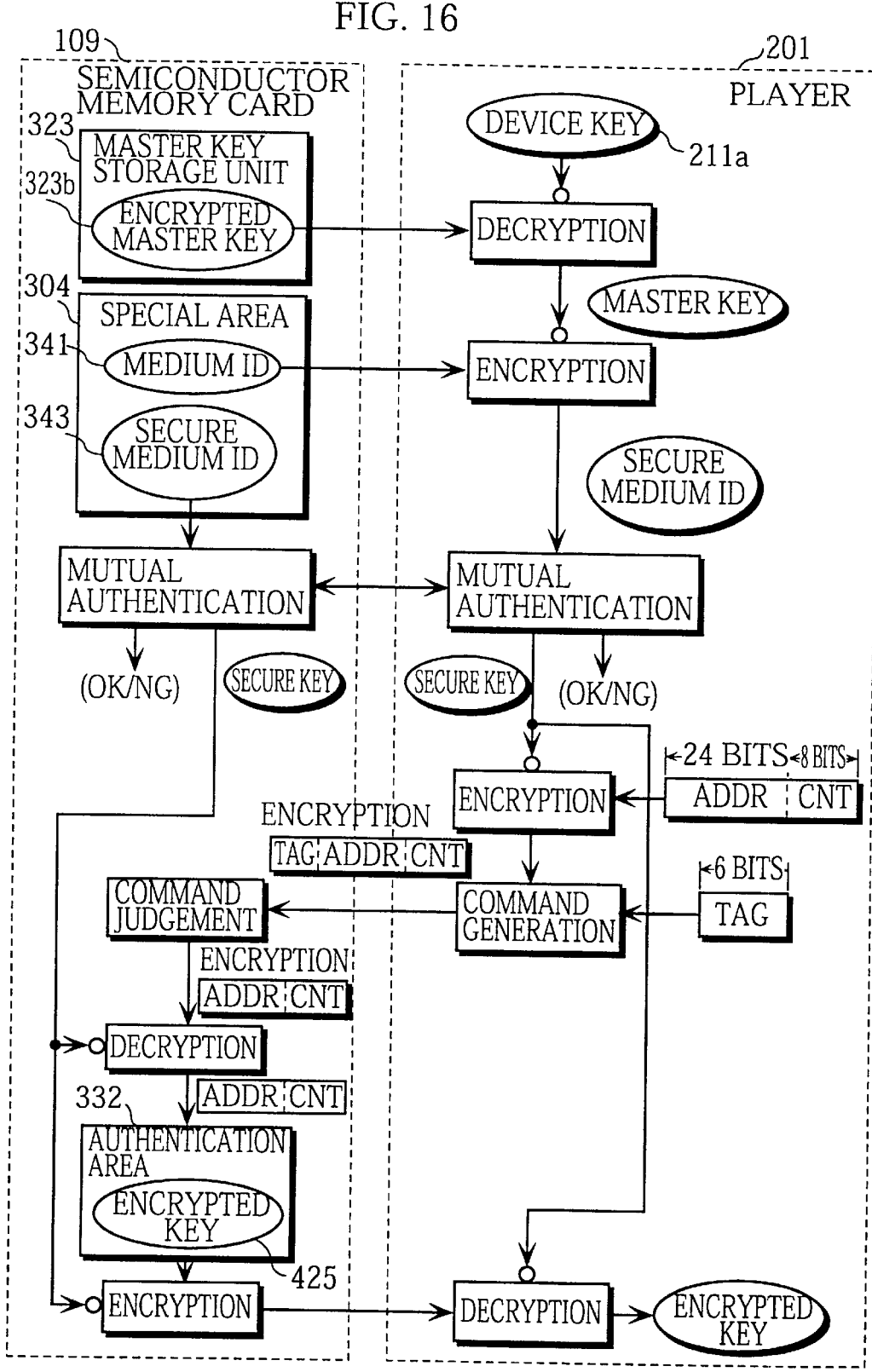
FIG. 16 shows a communication sequence in a variation of the authentication of the present invention between the memory card and an external device.

FIG. 16 shows a communication sequence in a variation of the authentication between the memory card 109 and an external device (in the present example, the player 201).

Note that the processes shown in FIG. 16 are mainly achieved by the authentication circuit 216 of the player 201, a control program 111b of the PC 102, and the authentication unit 321 of the memory card 109. It is presumed here that the master key storage unit 323 of the memory card 109 stores an encrypted master key (encrypted master key 323), and that the special area 304 stores a secure medium ID 343 as well as the medium ID 341, the secure medium ID 343 being generated by encrypting the medium ID 341.

First, the player 201 issues a command to the memory card 109 to obtain the master key 323b from the memory card 109, and decrypts the obtained master key 323b using the device key 211a. The decryption algorithm used in this decryption corresponds to the encryption algorithm used in the encryption of the master key 323b which has now been read out from the memory card 109. Therefore, when the device key 211a the player 201 has is an authorized one, the decryption is expected to restore the original master key.

The player 201 then issues a command to the memory card 109 to obtain the medium ID 341 from the memory card 109, and encrypts the obtained medium ID 341 using the restored master key. The encryption algorithm used in this encryption is the same as the encryption algorithm used in the encryption of the secure medium ID 343 which is stored in the memory card 109. Therefore, the encryption provides a secure medium ID which is the same as the secure medium ID 343 contained in the memory card 109.

The player 201 and the memory card 109 perform a mutual authentication using the secure medium IDs they respectively have. Through this mutual authentication, each of the devices generates (OK/NG) information and a secure key, the (OK/NG) information indicating whether the remote device has been authenticated, and the secure key being a time-variant key that depends on the authentication result. The secure keys owned by both devices match only when both devices 201 and 109 affirmatively authenticate the other devices, and the secure keys change each time a mutual authentication is performed.

As described above, a boundary is set between the authentication area and the non-authentication area in the flash memory 303, and the size of both areas is changed by moving the boundary. This enables the memory card 109 to be used for various purposes. For example, the memory card 109 may be mainly used for storing digital contents which need to be protected by copyright, or the memory card 109 may be mainly used for other purposes than storing such digital contents.

After a mutual authentication has completed affirmatively, the player 201 generates a command which is used to access the authentication area 332 in the memory card 109. More specifically, for example, when data is read out from the authentication area 332, a parameter (a 24-bit address "address" and an 8-bit count "count") of the command "SecureRead address count" is encrypted using the secure key, and an encrypted command, which is generated by combining the encrypted parameter and a tag (a 6-bit code indicating a command type "SecureRead") of the command, is sent to the memory card 109.

On receiving the encrypted command, the memory card 109 judges the type of the command. In the present example, the command is judged to be "SecureRead" to read data from the authentication area 332.

When the command is judged to be a command to access the authentication area 332, the parameter contained in the command is decrypted using the secure key obtained through the mutual authentication. The decryption algorithm used in this decryption corresponds to the encryption algorithm used in the encryption of the command by the player 201. Therefore, when the mutual authentication completes affirmatively, that is to say, when the secure keys used by both devices match, the parameter obtained by the decryption should be equal to the original parameter used by the player 201.

The memory card 109 then reads out the encryption key 425 from a sector in the authentication area 332 indicated by the decrypted parameter, encrypts the read-out encryption key 425 using the secure key, and sends the encrypted encryption key to the player 201.

The player 201 decrypts the received data using the secure key obtained through the mutual authentication. The decryption algorithm used in this decryption corresponds to the encryption algorithm used in the encryption of the encryption key 425 by the memory card 109. Therefore, when the mutual authentication completes affirmatively, that is to say, when the secure keys used by both devices match, the data obtained by the decryption should be equal to the original encryption key 425.

The memory card 109, each time a command to access the authentication area 332 is executed, discards (deletes) a secure key used in the command execution. With this arrangement, an external device attempting to access the authentication area 332 in the memory card 109 needs to perform a mutual authentication each time the external device issues a command and to be affirmative in the authentication beforehand.

Figure 17:
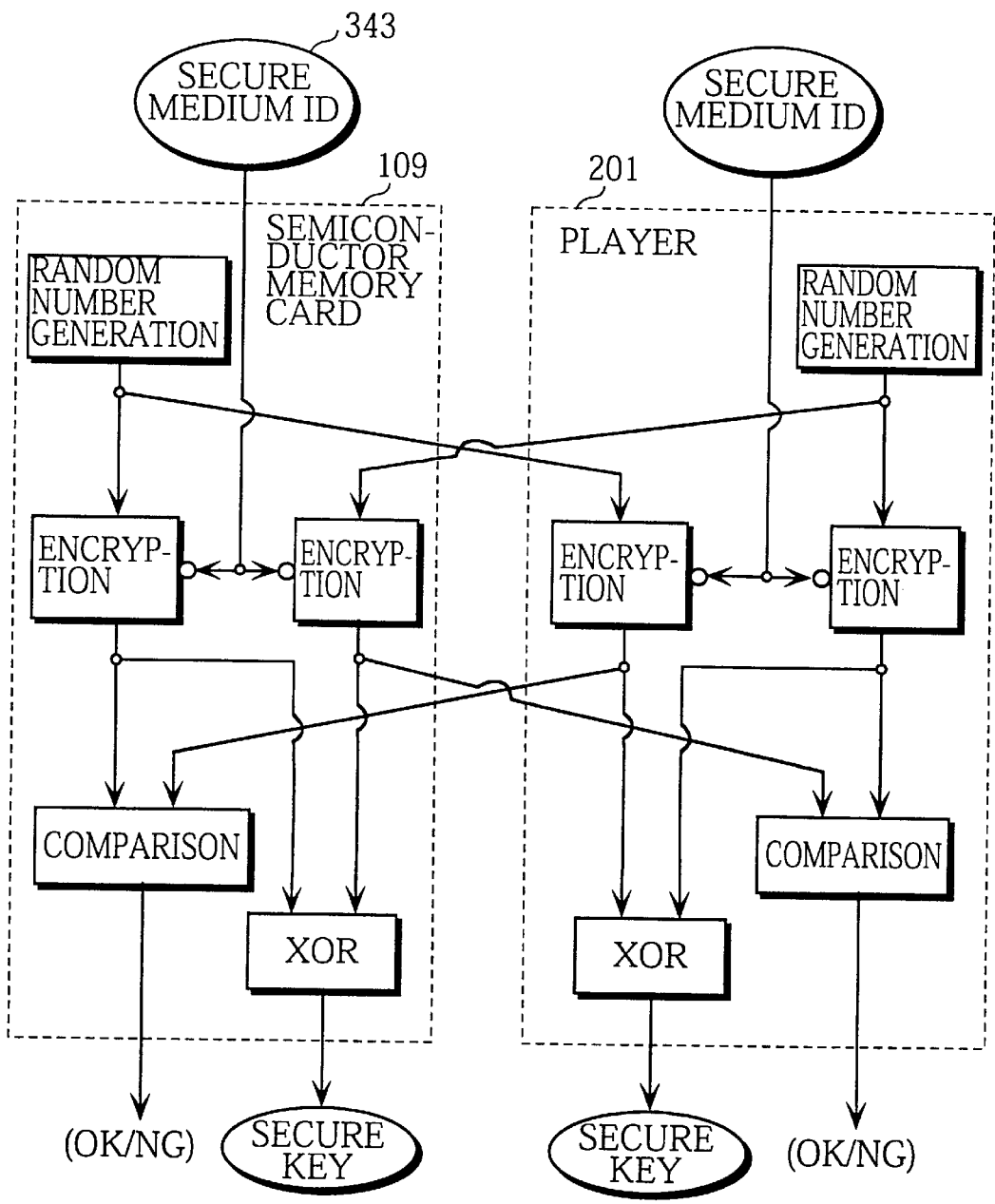
FIG. 17 shows a communication sequence in a detailed procedure of the mutual authentication shown in FIG. 16.

FIG. 17 shows a communication sequence in a detailed procedure of the mutual authentication shown in FIG. 16. In the present example, the memory card 109 and the player 201 perform a challenge-response-type mutual authentication.

The memory card 109 generates a random number and sends the random number to the player 201 as challenge data to check the properness of the player 201. The player 201 encrypts the challenge data and returns the encrypted challenge data to the memory card 109 as response data to certify the properness of the player 201. The memory card 109 encrypts the random number sent as challenge data, and compares the received response data with the encrypted challenge data. When the received response data and the encrypted challenge data match, the memory card 109 judges that the authentication of the player 201 has been affirmative (OK), and receives a command to access the authentication area 332 from the player 201. When the received response data and the encrypted challenge data do not match, the memory card 109 judges that the authentication of the player 201 has not been affirmative (NG), and if the player 201 sends a command to access the authentication area 332 after the judgement, the memory card 109 rejects the command.

The player 201 performs a similar authentication procedure to check the properness of the memory card 109. That is to say, the player 201 generates a random number and sends the random number to the memory card 109 as challenge data to check the properness of the memory card 109. The memory card 109 encrypts the challenge data and returns the encrypted challenge data to the player 201 as response data to certify the properness of the memory card 109. The player 201 encrypts the random number sent as challenge data, and compares the received response data with the encrypted challenge data. When the received response data and the encrypted challenge data match, the player 201 judges that the authentication of the memory card 109 has been affirmative (OK), and accesses the authentication area 332 in the memory card 109. When the received response data and the encrypted challenge data do not match, the player 201 judges that the authentication of the memory card 109 has not been affirmative (NG), and gives up accessing the authentication area 332.

All the encryption algorithms used in the mutual authentication should be the same as far as the memory card 109 and the player 201 are authorized ones. The memory card 109 and the player 201 obtain a secure key by performing an exclusive-or operation using the encrypted challenge data and the response data obtained through the authentication and certification of the properness. The obtained secure key, or the result of the above exclusive-or operation, is used for accessing the authentication area 332 in the memory card 109. With this arrangement, it is possible for both devices 109 and 201 to share a time-variant secure key that is common to them only when they have been affirmative in the authentication. This renders the affirmative authentication a necessary condition for accessing the authentication area 332.

The secure key may be a result of an exclusive-or operation using the encrypted challenge data, the response data, and the secure medium ID.

Now, a variation of a function to change the boundary between the authentication area 332 and non-authentication area 331 in the memory card 109 will be described with reference to FIGS. 18 and 19.

Figures 18A, 18B, 18C:
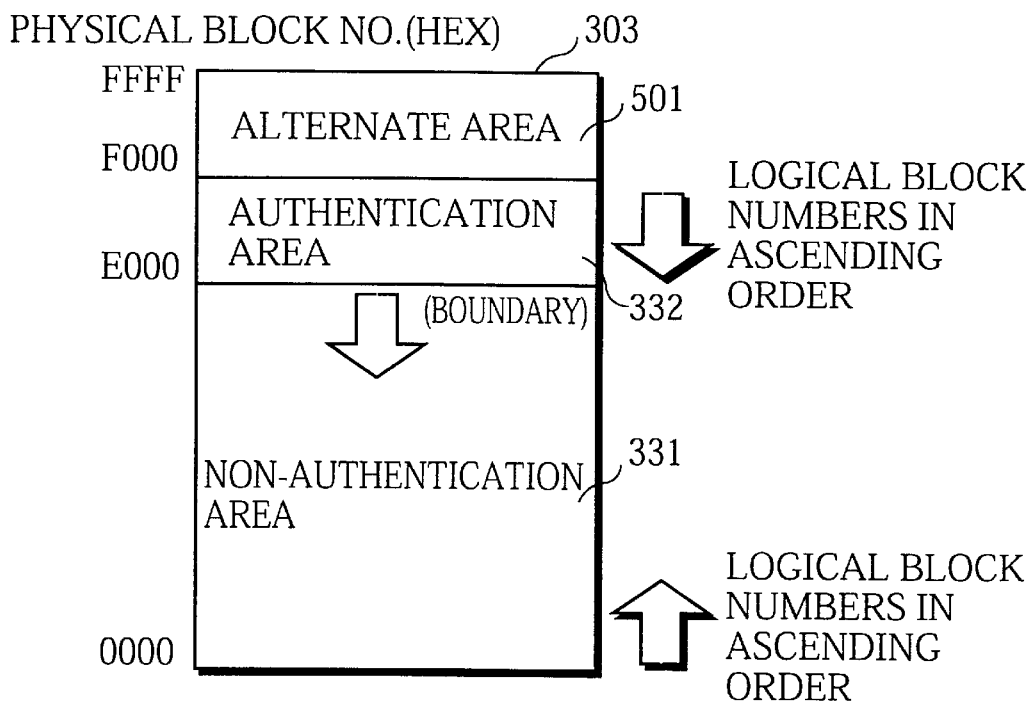
FIGS. 18A to 18C show the state before the boundary between the authentication and non-authentication areas of the semiconductor memory card is changed, where

FIGS. 18A to 18C show the use state of the flash memory 303 before the boundary is changed. FIG. 18A is a memory map showing the construction of the physical blocks in the flash memory 303.

FIG. 18B shows a conversion table 1103 which is dedicated to the non-authentication area 331 and is stored in a nonvolatile storage area in the non-authentication area access control unit 326. The conversion table 1103 shows relationships between the logical blocks and physical blocks in the non-authentication area 331. The non-authentication area access control unit 326 refers to the conversion table 1103 to convert a logical address into a physical address or to detect an improper access accessing outside an allocated storage area.

FIG. 18C shows a conversion table 1102 which is dedicated to the authentication area 332 and is stored in a nonvolatile storage area in the authentication area access control unit 325. The conversion table 1102 shows relationships between the logical blocks and physical blocks in the authentication area 332. The authentication area access control unit 325 refers to the conversion table 1102 to convert a logical address into a physical address or to detect an improper access accessing outside an allocated storage area.

As shown in FIG. 18A, before the boundary is changed, out of the flash memory 303 composed of physical blocks 0000 to FFFF, physical blocks F000 to FFFF are allocated to the alternate block area 501, physical blocks 0000 to DFFF whose addresses are lower than the boundary are allocated to the non-authentication area 331, and physical blocks E000 to EFFF whose addresses are higher than the boundary are allocated to the authentication area 332.

As understood from the conversion table 1103 shown in FIG. 18B, the logical block numbers match the physical block numbers in the non-authentication area 331. On the other hand, as understood from the conversion table 1102 shown in FIG. 18C, there is an inverse relationship between the logical block numbers and the physical block numbers in the authentication area 332. That is to say, logical blocks 0000 to 0FFF correspond to physical blocks EFFF to E000, respectively. This arrangement has been made by considering that the logical blocks are used in ascending order, and that when the boundary is moved, data in the physical blocks to be moved needs to be saved or moved.

FIGS. 19A to 19C show the use state of the flash memory 303 after the boundary is changed. FIGS. 19A to 19C correspond to FIGS. 18A to 18C, respectively. Note that the boundary change is achieved by the following procedure:

(1) A dedicated command specifying an address of the boundary is input to the command judgement control unit 322 via a command pin; and (2) The command judgement control unit 322 rewrites the conversion table 1102 in the authentication area access control unit 325 and the conversion table 1103 in the non-authentication area 331.

As shown in FIGS. 19A to 19C, the boundary is moved from between the physical blocks E000 and DFFF to between the physical blocks D000 and CFFF. That means the size of the non-authentication area 331 is reduced by 1000(hex) blocks, and the size of the authentication area 332 is increased by 1000(hex) blocks.

As shown in FIG. 19B, along with the above boundary change, the size of the conversion table 1103 of the non-authentication area 331 is reduced by 1000(hex) entries, and the size of the authentication area 332 is increased by 1000(hex) entries, so that the conversion table 1103 shows logical blocks 0000 to CFFF with corresponding physical blocks 0000 to CFFF. In contrast, as shown in FIG. 19C, the size of the conversion table 1102 of the authentication area 332 is increased by 1000(hex) entries, and the size of the authentication area 332 is increased by 1000(hex) entries, so that the conversion table 1102 shows logical blocks 0000 to 1FFF with corresponding physical blocks EFFF to D000.

As described above, a boundary is set between the authentication area and the non-authentication area in the flash memory 303, and the size of both areas is changed by moving the boundary. This enables the memory card 109 to be used for various purposes. For example, the memory card 109 may be mainly used for storing digital contents which need to be protected by copyright, or the memory card 109 may be mainly used for other than storing such digital contents.

In both the authentication area and the non-authentication area, the amount of processing in moving and saving data along with the boundary change can be reduced by corresponding the logical blocks to the physical blocks so that physical blocks are used in the order of remoteness starting at the most remote one.

The above correspondence between the logical and physical blocks is easily achieved when the conversion table 1102 dedicated to the authentication area 332 and the conversion table 1103 dedicated to the non-authentication area 331 are separately provided.

In the above example, in the authentication area 332, there is an inverse relationship between the logical addresses and the physical addresses in units of blocks. However, other units may be used. For example, there may be an inverse relationship between the logical addresses and the physical addresses in units of sectors or bytes.

Up to this point, the memory card of the present invention has been described in its embodiment and variations. However, the present invention is not limited to the embodiment and variations.

In the above embodiment, the PC 102 or the player 201 is required to perform a mutual authentication with the memory card 109 using the same procedure each time it issues a command to access the authentication area 332 in the memory card 109. However, a simplified authentication procedure may be used to access the authentication area 332, depending on the command type.

For example, when the write command "SecureWrite" is issued, the encrypted master key 323*b* and the medium ID 341 may not be obtained from the memory card 109, but the memory card 109 may execute the write command "SecureWrite" even when only a one-way authentication (an authentication of a device by the memory card 109) completes affirmatively. With this arrangement, commands which are little related to the copyright protection will be executed at high speed.

The flash memory 303 in the memory card 109 of the present invention may be replaced with another storage medium (e.g., a nonvolatile medium such as a hard disk, an optical disc, and a magnet optical disc). A portable storage card capable of securing a copyright on the stored data as the present invention can be achieved using any of such mediums.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A semiconductor memory card for use with an electronic device, said semiconductor memory card comprising:
 a rewritable nonvolatile memory; and
 a control circuit operable to control accesses by the electronic device to an authentication area and a non-authentication area in said rewritable nonvolatile memory;
 said control circuit comprising:
  a non-authentication area access control unit operable to control accesses by the electronic device to the non-authentication area;
  an authentication unit operable to perform an authentication process to check whether the electronic device has authority to access said semiconductor memory card, and affirmatively authenticate the electronic device when the electronic device has authority to access said semiconductor memory card; and
  an authentication area access control unit operable to permit the electronic device to access the authentication area only when said authentication unit affirmatively authenticates the electronic device;
 wherein the authentication area and the non-authentication area are provided by dividing a continuous area of a predetermined size in said rewritable nonvolatile memory into two parts; and
 wherein said semiconductor memory card further comprises:
  wherein the authentication area and the non-authentication area are provided by dividing a continuous area of a predetermined size in said rewritable nonvolatile memory into two parts; and
 wherein said semiconductor memory card further comprises:
  a device operable to hold an address marking a boundary between the authentication area and the non-authentication area; and
  an area resizing circuit operable to resize the authentication area and the non-authentication area, wherein said area resizing circuit resizes the authentication area and the non-authentication area by changing the boundary marking address, said area resizing circuit comprising:
   an authentication area conversion table operable to provide a correspondence between logical addresses and physical addresses in the authentication area;
   a non-authentication area conversion table operable to provide a correspondence between logical addresses and physical addresses in the non-authentication area; and
   a conversion table change unit operable to change contents of said authentication area conversion table and said non-authentication area conversion table in accordance with an instruction from the electronic device;
  wherein said authentication area access control unit and the non-authentication area access control unit control accesses by the electronic device to the authentication area and the non-authentication area by referring to the boundary marking address;
  wherein said authentication area access control unit is operable to control accesses by the electronic device to the authentication area by referring to said authentication area conversion table; and
  wherein said non-authentication area access control unit is operable to control accesses by the electronic device to the non-authentication area by referring to said non-authentication area conversion table.

2. A semiconductor memory card as claimed in claim 1, wherein:
 an area addressed with higher physical addresses and an area addressed with lower physical addresses both constituting the area having the predetermined size are respectively allocated to the authentication area and the non-authentication area;
 said non-authentication area conversion table is operable to provide a correspondence between logical addresses arranged in an ascending order and physical addresses arranged in an ascending order; and
 said authentication area conversion table is operable to provide a correspondence between logical addresses arranged in an ascending order and physical addresses arranged in descending order.

3. A semiconductor memory card for use with an electronic device, said semiconductor memory card comprising:

a rewritable nonvolatile memory; and a control circuit operable to control accesses by the electronic device to an authentication area and a non-authentication area in said rewritable nonvolatile memory;

said control circuit comprising:

a non-authentication area access control unit operable to control accesses by the electronic device to the non-authentication area;

an authentication unit operable to perform an authentication process to check whether the electronic device has authority to access said semiconductor memory card, and affirmatively authenticate the electronic device when the electronic device has authority to access said semiconductor memory card;

an authentication area access control unit operable to permit the electronic device to access the authentication area only when said authentication unit affirmatively authenticates the electronic device;

a conversion table operable to provide a correspondence between logical addresses and physical addresses in each of the authentication area and the non-authentication area; and a conversion table change circuit operable to change contents of said conversion table in accordance with an instruction from the electronic device;

wherein the authentication area and the non-authentication area are provided by dividing a continuous area of a predetermined size in said rewritable nonvolatile memory into two parts; and wherein said semiconductor memory card further comprises:

a device operable to hold an address marking a boundary between the authentication area and the non-authentication area; and an area resizing circuit operable to resize the authentication area and the non-authentication area, wherein said area resizing circuit resizes the authentication area and the non-authentication area by changing the boundary marking address;

wherein said authentication area access control unit and the non-authentication area access control unit control accesses by the electronic device to the authentication area and the non-authentication area by referring to the boundary marking address; and wherein said authentication area access control unit and the non-authentication area access control unit are operable to control accesses by the electronic device to the authentication area and the non-authentication area, respectively, by referring to said conversion table.

4. A semiconductor memory card for use with an electronic device, said semiconductor memory card comprising:

a rewritable flash memory; and a control circuit operable to control accesses by the electronic device to an authentication area and a non-authentication area in said rewritable flash memory;

said control circuit comprising:

a non-authentication area access control unit operable to control accesses by the electronic device to the non-authentication area;

an authentication unit operable to perform an authentication process to check whether the electronic device has authority to access said semiconductor memory card, and affirmatively authenticate the electronic device when the electronic device has authority to access said semiconductor memory card;

an authentication area access control unit operable to permit the electronic device to access the authentication area only when said authentication unit affirmatively authenticates the electronic device;

a not-deleted list holding unit operable to hold a non-deleted list that provides a list of not-deleted areas in the authentication area and the non-authentication area; and a not-deleted area sending unit operable to, in accordance with an instruction from the electronic device, refer to the not-deleted list to identify not-deleted areas in the authentication area and the non-authentication area, and send information indicating the identified not-deleted areas to the electronic device.

wherein the authentication area and the non-authentication area are provided by dividing a continuous area of a predetermined size in said rewritable flash memory into two parts; and wherein said semiconductor memory card further comprises:

a device operable to hold an address marking a boundary between the authentication area and the non-authentication area; and an area resizing circuit operable to resize the authentication area and the non-authentication area, wherein said area resizing circuit resizes the authentication area and the non-authentication area by changing the boundary marking address; and wherein said authentication area access control unit and the non-authentication area access control unit control accesses by the electronic device to the authentication area and the non-authentication area by referring to the boundary marking address.

* * * * *

UNITED STATES PATENT AND TRADEMARK OFFICE
CERTIFICATE OF CORRECTION

PATENT NO. : 6,606,707 B1
DATED : August 12, 2003
INVENTOR(S) : Teruto Hirota et al.

It is certified that error appears in the above-identified patent and that said Letters Patent is hereby corrected as shown below:

<u>Title page,</u>
Item [30], Foreign Application Priority Data, add:
-- Apr. 27, 1999 (JP) ............ 11-119441
   Dec. 28, 1999 (JP) .............11-374788 --

<u>Column 5,</u>
Line 36, change "-of" to -- of --.

<u>Column 6,</u>
Line 8, delete "3" after "the".

<u>Column 7,</u>
Line 62, change "10i" to -- 107 --.

<u>Column 8,</u>
Line 42, delete "10" after "slot".

<u>Column 10,</u>
Line 23, change "non-authehtication" to -- non-authentication --.

<u>Column 13,</u>
Line 59, change "33i" to -- 331 --.

<u>Column 15,</u>
Line 32, change "Memory" to -- memory --.

<u>Column 20,</u>
Lines 64-66, delete "in the not-deleted blocks needs to be deleted at once before the blocks are used next (before another data is written to the not-deleted blocks)".

<u>Column 26,</u>
Line 62, change "other than" to -- other purposes than --

<u>Column 28,</u>
Line 9-14, delete "wherein the authentication area and the non-authentication area are provided by dividing a continuous area of a predetermined size in said rewritable nonvolatile memory into two parts; and
wherein said semiconductor memory card further comprises:".

UNITED STATES PATENT AND TRADEMARK OFFICE
CERTIFICATE OF CORRECTION

PATENT NO. : 6,606,707 B1
DATED : August 12, 2003
INVENTOR(S) : Teruto Hirota et al.

It is certified that error appears in the above-identified patent and that said Letters Patent is hereby corrected as shown below:

Column 30,
Line 31, change "device." to -- device; --.

Signed and Sealed this

Seventh Day of September, 2004

JON W. DUDAS
*Director of the United States Patent and Trademark Office*